(12) United States Patent
Kremen

(10) Patent No.: US 7,890,436 B2
(45) Date of Patent: Feb. 15, 2011

(54) BILLING AND PAYMENT METHODS AND SYSTEMS ENABLING CONSUMER PREMISES EQUIPMENT

(75) Inventor: Gary Kremen, San Francisco, CA (US)

(73) Assignee: Clean Power Finance, Inc., San Francisco, CA (US)

( * ) Notice: Subject to any disclaimer, the term of this patent is extended or adjusted under 35 U.S.C. 154(b) by 881 days.

(21) Appl. No.: 11/653,052

(22) Filed: Jan. 12, 2007

(65) Prior Publication Data

US 2008/0091625 A1  Apr. 17, 2008

Related U.S. Application Data

(60) Provisional application No. 60/853,050, filed on Oct. 17, 2006.

(51) Int. Cl.
*G01R 11/56* (2006.01)

(52) U.S. Cl. ...................................... 705/412
(58) Field of Classification Search ........................ None
See application file for complete search history.

(56) References Cited

U.S. PATENT DOCUMENTS

| | | | |
|---|---|---|---|
| 4,337,466 A | 6/1982 | Spahn | |
| 4,346,442 A | 8/1982 | Musmanno | |
| 4,376,978 A | 3/1983 | Musmanno | |
| 4,383,210 A | 5/1983 | Wilkinson | |
| 4,597,046 A | 6/1986 | Musmanno et al. | |
| 4,774,663 A | 9/1988 | Musmanno et al. | |
| 4,993,348 A * | 2/1991 | Wald | 114/265 |
| 5,694,552 A | 12/1997 | Aharoni | |
| 5,940,809 A | 8/1999 | Musmanno et al. | |
| 6,025,774 A | 2/2000 | Forbes | |
| 6,154,730 A | 11/2000 | Adams et al. | |
| 6,191,501 B1 | 2/2001 | Bos | |
| 6,195,648 B1 | 2/2001 | Simon et al. | |
| 6,521,129 B1 * | 2/2003 | Stamper et al. | 210/603 |
| 6,553,353 B1 | 4/2003 | Littlejohn | |
| 6,717,527 B2 | 4/2004 | Simon | |
| 6,785,592 B1 | 8/2004 | Smith et al. | |

(Continued)

FOREIGN PATENT DOCUMENTS

DE  3805677 A1  9/1989

(Continued)

OTHER PUBLICATIONS

"GMAC Mortgage Offers Financing for Solar", www.resnet.us/ratings/overview/resources/gmac.htm, retrieved Oct. 23, 2009.*

(Continued)

*Primary Examiner*—Rutao Wu
(74) *Attorney, Agent, or Firm*—Perkins Coie LLP

(57) ABSTRACT

The present invention teaches a variety of systems and methods enabling renewable energy consumer premises equipment (CPE) such as dual metering techniques. The present invention contemplates, among other things, supporting, by increasing a likelihood of meeting financing obligations, a consumer purchasing, leasing, installing and/or maintaining renewable energy CPE for power generation at a consumer premises. The renewable energy CPE may be attached to a structure on the consumer premises, disposed free standing on the consumer premises, or utilized through any other suitable means on the consumer premises.

16 Claims, 15 Drawing Sheets

PRIOR ART

U.S. PATENT DOCUMENTS

| | | | |
|---|---|---|---|
| 6,828,692 | B2 | 12/2004 | Simon |
| 6,870,467 | B2 | 3/2005 | Simon |
| 6,947,854 | B2 | 9/2005 | Swarztrauber et al. |
| 6,980,973 | B1 | 12/2005 | Karpenko |
| 7,171,287 | B2 | 1/2007 | Weiss |
| 7,191,150 | B1 | 3/2007 | Shao et al. |
| 7,274,975 | B2 | 9/2007 | Miller |
| 7,512,540 | B2 | 3/2009 | Gluck et al. |
| 7,698,219 | B2 | 4/2010 | Kremen |
| 2002/0035496 | A1 | 3/2002 | Fukushima et al. |
| 2002/0040356 | A1 | 4/2002 | Gluck et al. |
| 2002/0084645 | A1 | 7/2002 | Lobert et al. |
| 2002/0091653 | A1 | 7/2002 | Peevey |
| 2002/0103745 | A1 | 8/2002 | Lof et al. |
| 2002/0120569 | A1 | 8/2002 | Day |
| 2002/0128853 | A1 | 9/2002 | Kikuchi et al. |
| 2002/0143438 | A1 | 10/2002 | Akiyama et al. |
| 2002/0143693 | A1 | 10/2002 | Soestbergen et al. |
| 2002/0194145 | A1 | 12/2002 | Boucher et al. |
| 2003/0023467 | A1 | 1/2003 | Moldovan |
| 2003/0028479 | A1 | 2/2003 | Kirksey |
| 2003/0074244 | A1 | 4/2003 | Braxton |
| 2003/0080876 | A1 | 5/2003 | Martin |
| 2003/0093345 | A1 | 5/2003 | Cutbirth |
| 2003/0126060 | A1 | 7/2003 | Lof et al. |
| 2003/0144864 | A1* | 7/2003 | Mazzarella .................. 705/1 |
| 2004/0083163 | A1 | 4/2004 | Cooper |
| 2004/0117223 | A1 | 6/2004 | Smith |
| 2004/0138981 | A1 | 7/2004 | Ehlers et al. |
| 2005/0086341 | A1 | 4/2005 | Enga et al. |
| 2005/0137956 | A1 | 6/2005 | Flory et al. |
| 2005/0165672 | A1 | 7/2005 | Pembroke |
| 2006/0031180 | A1 | 2/2006 | Tamarkin et al. |
| 2006/0064366 | A1 | 3/2006 | Smith |
| 2006/0074794 | A1 | 4/2006 | Nespola |
| 2006/0276938 | A1 | 12/2006 | Miller |
| 2006/0277131 | A1 | 12/2006 | Bacon et al. |
| 2007/0055595 | A1 | 3/2007 | Keyes et al. |
| 2007/0150366 | A1 | 6/2007 | Yahiro et al. |
| 2007/0219932 | A1 | 9/2007 | Carroll et al. |
| 2008/0086411 | A1 | 4/2008 | Olson et al. |
| 2008/0091580 | A1 | 4/2008 | Kremen |
| 2008/0091581 | A1 | 4/2008 | Kremen |
| 2008/0091589 | A1 | 4/2008 | Kremen |
| 2008/0091590 | A1 | 4/2008 | Kremen |
| 2008/0091625 | A1 | 4/2008 | Kremen |
| 2008/0091626 | A1 | 4/2008 | Kremen |
| 2008/0172330 | A1 | 7/2008 | Kremen et al. |
| 2009/0024541 | A1 | 1/2009 | Kremen |

FOREIGN PATENT DOCUMENTS

| | | |
|---|---|---|
| DE | 3918203 | 12/1990 |
| EP | 342578 | 11/1989 |
| FR | 2689333 | 3/1992 |
| FR | 2746941 | 3/1996 |
| GB | 2100528 A | 12/1982 |
| GB | 2281401 | 3/1995 |
| JP | 10165232 A | 6/1998 |
| JP | 2003122819 | 4/2003 |
| WO | WO 88/06814 | 9/1988 |
| WO | WO 98/52003 | 11/1998 |

OTHER PUBLICATIONS

AEP Ohio "Tampering with Electric Meter Dangerous, Constitutes Theft of Energy", p. 1-2 (Apr. 27, 2005).

Barstow County Utility Permitting Procedures. p. 1-16 (2006).

Larson, Aaron. Durable Power of Attorney Form. p. 1-3 (Aug. 2003).

Legal Services of North Dakota. "Help! My Power Has Been Shut Off", p. 1-2 (Apr. 2004).

Montana Department of Environmental Quality. Net Metering and Easements, p. 1-2 (Jul. 2002).

The New York Times. "Patient on Life Support Dies After Power Cut", p. 1 (Sep. 24, 1989).

Ameresco, Connect to Smarter Energy Solutions, How Energy Savings Performance Contracting (ESPC) Works, http:/www.ameresco.com (2006).

"Attaining Financial Sustainability" (rev. Apr. 17, 2002). http://www.worldbank.org/astae/pvpdf/chapter6.pdf.

Basic Big Apple Solar Installation Commitment, *Basic Partnership New York City Million Solar Roofs Initiative Executive Summary*, 5 pgs., Basic c/o Solar Energy Systems, Brooklyn, NY (published Jun. 26, 2003).

Basic Big Apple Solar Installation Commitment, *Guide to Solar System Financing*, 2 pgs., publication date unknown, Big Apple Solar Installation Commitment, NY, NY (2004). See.www.basicsolar.org.

California Energy Commission, *Consumer Energy Center—List of Companies Financing Solar, Wind and Other Energy Systems*, 4 pgs., http://www.consumerenergycenter.org/erprebate/financial_companies (Updated May 23, 2006).

California Energy Commission, *Financing Options Fact Sheet—Residential Financing Options for Renewable Energy Systems*, 2 pgs. Renewable Energy Program, Sacramento, CA USA (May 2004).

California Public Utilities Commission, *PUC Business Meeting*, 3 pgs., (Dec. 11, 2006) See http://www.cpuc.ca.gov.

"CDM Financing" pp. 1-91 (Feb. 2006). http://www.conservationbureau.on.ca/Storage/14/1913_CDM_Financing.pdf).

CLARKPUBLICUTILITIES.COM, *Remote Meter Reading*, 2 pgs., (May 15, 2004) http://www.clarkpublicutilities.com/Residential/meterReading/remoteMeterReading.

Clay Electric Cooperative, Inc., Remote Meter Reading (Aug. 2003).

Citizenre agreement "Forward Rental Agreement General Terms and Conditions" Form—(Dec. 28, 2006). See www.citizenre.com.

Comtech Holdings Limited, *Automatic Meter Reading—AMR(Modems)/Telemetry Examples*, Copyright Comtech Holdings Limited, 3 pgs (2006).

Dallas Semiconductor—Maxim, *Application Note 3875—Power Meter Reference Design Enables Automatic Meter Reading With Communication Over the Powerline(PLC/AM*, 3 pgs., Application Note 3875:(Jun. 30, 2006).

Dow Jones Indexes, *Dow Jones U.S. Daily Electricity Prices Indexes*, 2 pgs (Reporting Year 2006).

Endecon Engineering, *A Guide to Photovoltaic(PV)System Design and Installation*, pgs. 1-3, San Ramon, CA, USA (Jun. 2001).

Environmental Protection Agency, Alliance to Save Energy. 2. EPA/Alliance to Save Energy. Save Money, Conserve Energy (2003).

Ernst Publishing, *Real Estate vs. UCC*, 4 pgs., (May 22, 2005) http://www.ernstpublishing.com/uccvsre.htm.

Fat Spaniel Technologies, *Assessment Tool*, Fat Spaniel Technologies, Inc., 3 pgs., (Copyright © 2004-2007) .http://www.fatspaniel.com/solutions/system-installer-services.html.

Ferrey, Steven, "Small Power Purchase Agreement Application for Renewable Energy Development: Lessons From Five Asian Countries" Asia Alternative Energy Program, The World Bank, Washington D.C. (Feb. 2004).

Find Solar, *Imagine the Feeling*, "My Solar Estimator", and "Find a Solar Pro", (2006).

Findlaw, *California Codes, California Civil Code, Civil Code Section* 1912-1916.12, 12 pgs, (1983).

FORECLOSURENET.NET, *How to Avoid Home-Sale Trouble With Fixtures,*, 5 pgs (May 12, 2006).

Freeadvice, *Real Estate law—Commercial Real Estate—Fixtures*, 2 pgs., (Feb. 17, 2004) http://real-estate-law.freeadvice.com/commercial_real_estate/fixtures.htm.

Home Power—The Hands-On Journal of Home-Made Power, *Making Sense of Solar-Electric System Costs*, Home Power 109, 7 pgs., (Oct. & Nov. 2005) www.homepower.com.

Howstuffworks, *How Power Grids Work*, HowStuffWorks, Inc., 12 pgs., (Oct. 27, 2005)http://science.howstuffworks.com/power.htm/printable.

Howstuffworks, *How Solar Cells Work*, HowStuffWorks, Inc., 6 pgs., (Oct. 27, 2005).http://science.howstuffworks.com/solar-cell.htm/printable.

LaMonica, Martin, c/net News.com "Pumping, power onto the grid from your basement," (Aug. 10, 2006).

Laudicina, Daniel J., *Business Lawyer*, "The Emerging Law of Starter Interrupt Devices", (Feb. 1, 2006).

"Leasing to Support Small Businesses and Microenterprises" pp. 1-3 and 28 (2002).

Pedreira, Tom, Security Interests—The Basics, Lexis-Nexis, (Copyright 2002). http://debtor-creditor.lawyers.com/creditors-rights/Security-Interests—The-Basics.html.

McClintock, Meredith, Solar Electric Dealers 2004: Dynamic Markets, Significant Opportunities, Challenging Threats, pp. 1-114, Coast Hills Partners, Portola Valley, CA, (Copyright © 2004-2005).

National Renewable Energy Laboratory, PVwatts A Performance Calculator for Grid connected PV Systems, (2006).

New Hope & Ivyland Railroad, Temporary License Permitting Entry on Property (Rev. Jun. 2002).

New Jersey's Clean Energy Program™, *Current SREC Trading Statistics, Through Dec. 2006, Reporting Year 2007* (for production between Jun. 1, 2006-May 31, 2007), 2 pgs.

New Jersey's Clean Energy Program™, *Frequently Asked Questions: New Jersey's Solar Renewable Energy Certificates (SRECs) Program*, 4 pgs (May 6, 2006).

New Jersey's Clean Energy Program™, *New Jersey Solar Renewable Energy Certificate Program*, 2 pgs., (Jul. 10, 2006).

New York Energy $MART$^{SM}$ Loan Fund, *Application Kit for Existing 1-4 Family Homes*, 9 pgs., New York State Energy Research and Development Authority, Albany, NY (May 8, 2006).

New York Energy $MART$^{SM}$ Loan Fund, *Lender Kit*, 74 pgs., New York State Energy Research and Development Authority, Albany, NY (Revised May 2006).

New York Energy $MART$^{SM}$ Loan Fund, *Policy and Procedures Manual*, pp. 1-19 (Revised May 2006).

New York Energy $MART$^{SM.}$ *Solar Power—NYSERDA's Clean Power Estimator for Solar-Electric or Photovoltaic (PV) System*, 10 pgs (Copyright 1998-2002).

Noresco, *Energy Savings Performance Contracting Solutions*, 1 pg., (Oct. 29, 2004) http://www.noresco.com/site/content/ei_espc_financial.asp.

Northern Arizona Wind & Sun, *Solar Basics, Solar Maps*, 6 pgs., http://www.windsun.com/Solar_Basics/Solar_maps.htm (Last Updated May 12, 2006).

Nyseg, *Reading Your Meter*, 8 pgs (2006).

"The OnGrid Solar Financial Analysis Tool Contact License Agreement" OnGrid Solar Contract License Agreement pp. 1-4 (2004).

Pacific Gas & Electric Schedule E-2—Experimental Residential Time-Of-Use Service (Mar. 25, 2003).

PG&E Rule 11—Discontinuance and Restoration Service ER11.pdf (Jun. 1, 2003).

http://www.passtimeusa.com/ourproducts.htm, Starter Interrupt Devices (1997).

http://www.ppsontime.com/PRODUCTS/tabid/54/Default.aspx, Starter Interrupt Device (2005).

"Potential for Development of Pays in New York State" http://www.paysamerica.org/Papers/NYSERDAWhitePaper.pdf (Aug. 3, 2005).

Powair, Van Jamison, *The "Green" Value of Renewable Power, Renewable Energy Credits "Green Tags"*, 12 pgs., Harvesting Clean Energy Conference, Van Jamison, POWAIR (Jan. 21, 2004).

Russell, Scott, *Solar-Electric Systems Simplified*, Home Power 104/ Dec. 2004 & Jan. 2005, 104:72-78 (2005).

San Isabel Electric Association, Inc., *Take the Mystery Out of Your Electric Meter*, San Isabel Electric, 5 pgs., (Copyright 2005) http://www.siea.com/meters/meter.cfm.

SEIA Solar Energy Industries Association, "Guide to Federal Tax Incentives for Solar Energy" (Released May 26, 2006).

Sharp, *The Components That Make Up a Residential Solar System*, Sharp Electronics Corp., 2 pgs., (Copyright 2006). http://www.sharpusa.com/solar/system_basics/0,2465,1-2,00.html.

SOLAR4POWER, *The Basics of Solar Power for Producing Electricity*, 5 pgs., (Feb. 11, 2004) http://www.solar4power.com/solar-power-basics.html.

"Starter-Interrupt Device is the New High-Tech Repo Man", (Jun. 19, 2006) http://cartracker500.com/2006/06/19/starter-interrupt-device-is-the-new-high-tech-repo-man/#more-89).

Tamarkin, Tom D., *Automatic Meter Reading*, 6 pgs., (Sep. 1992). http://www.energycite.com/amr.htm.

Tropos Networks, *MetroMesh and Automated Meter Reading: A Winning Combination*, A Technology Brief, 6 pgs., Sunnyvale, CA, (Aug. 2005).

U.S. Department of Energy, *The Borrower's Guide to Financing Solar Energy Systems—A Federal Overview*, Mar. 1999, Second Edition, A Revision of DOE/GO-10098-660, pp. 1-40, USA (Sep. 1998).

UCC: Uniform Commercial Code, *U.C.C.—Article 2A—Leases . . . Part 3. Effect of Lease Contract*, 2 pgs., (Copyright 2005). http://www.law.cornell.edu/ucc/2A/2A-309.html.

Uniform Computer Information Transactions Act (copyright 2002).

Weise, Steven O., "A Comparison of Current and Revised Article 9", pp. 105-125 (1995).

Wiles, John, *Code Corner—Working With Inspectors—What Your Checklist Should Include*, pp. 94-96, home power 113 (Jun. & Jul. 2006).

Wiles, John, *Making the Utility Connection*, IAEI News, pp. 2-10 (Oct. 2005).

Zocchetti, Kate—California Energy Commission, *Buying a Photovoltaic Solar Electric System—A Consumer Guide*, pp. 1-22, Sacramento, CA USA (Mar. 23, 2003).

Co-pending U.S. Appl. No. 11/652,712, filed Jan. 12, 2007.
Co-pending U.S. Appl. No. 11/653,043, filed Jan. 12, 2007.
Co-pending U.S. Appl. No. 11/653,044, filed Jan. 12, 2007.
Co-pending U.S. Appl. No. 11/653,167, filed Jan. 12, 2007.
Co-pending U.S. Appl. No. 11/653,325, filed Jan. 12, 2007.
Co-pending U.S. Appl. No. 11/750,941, filed May 18, 2007.
Co-pending U.S. Appl. No. 11/781,127, filed Jul. 20, 2007.
Co-pending U.S. Appl. No. 11/958,346, filed Dec. 17, 2007.
Co-pending U.S. Appl. No. 12/730,159, filed Mar. 23, 2010.
Non-Final Office Action Mailed Dec. 31, 2008 in Co-pending U.S. Appl. No. 11/958,346, filed Dec. 17, 2007.
Non-Final Office Action Mailed Mar. 22, 2010 in Co-pending U.S. Appl. No. 11/781,127, filed Jul. 20, 2007.
Non-Final Office Action Mailed Feb. 23, 2009 in Co-pending U.S. Appl. No. 11/653,043, filed Jan. 12, 2007.
Non-Final Office Action Mailed Feb. 26, 2009 in Co-pending U.S. Appl. No. 11/750,941, filed May 18, 2007.
Non-Final Office Action Mailed Feb. 4, 2008 in Co-pending U.S. Appl. No. 11/750,941, filed May 18, 2007.
Final Office Action Mailed Sep. 25, 2008 in Co-pending U.S. Appl. No. 11/750,941, filed May 18, 2007.
Notice of Allowance Mailed Nov. 3, 2009 in Co-pending U.S. Appl. No. 11/750,941, filed May 18, 2007.
Non-Final Office Action Mailed Jun. 25, 2009 in Co-pending U.S. Appl. No. 11/653,044, filed Jan. 12, 2007.
Non-Final Office Action Mailed Oct. 30, 2008 in Co-pending U.S. Appl. No. 11/652,712, filed Jan. 12, 2007.
Final Office Action Mailed Jul. 31, 2009 in Co-pending U.S. Appl. No. 11/652,712, filed Jan. 12, 2007.
"The Borrower's Guide to Financing Solar Energy Systems," A Federal Overview, second edition; DOE/GO-10099-742; Mar. 1999; 44 pps.
Borrego Solar. FAQ (2006); As viewed on the internet archive, http://web.archive.org/web20060222232937/http://borregosolar.com/resources/solar-energy-facts.php; pp. 1-6.
California Energy Commission, "Institutional Financing Options for Renewable Energy Systems, Financing Options Fact Sheet," Oct. 2002; http://www.greenlightsolar.com/pdf/institutional_financing.pdf; Jul. 24, 2009, 2 pgs.
California Energy Commission, "Residential Financing Options for Renewable Energy Systems. Financing Options Fact Sheet", Dec. 2002, http://www.utilityfree.com/pdf/refinance.pdf, Jul. 24, 2009, 2 pgs.
Campbell, H., "Blacks Law Dictionary", Fifth Edition, 1979, pp. 1-6.
Citizenre Renu. Forward Rental Agreement General Terms and Conditions. p. 1-6.

Contracts 2d. Pamphlet No. 1-3. As Adopted and Promulgated by the American Law Institute. 1981. p. 1-5.

Energy Resource, "SunEdison Ready to Begin Delivery Solar Energy to California State University, Chico," Oct. 26, 2006, p. 1.

Gallardo, J., World Bank Working Paper 1857, "Leasing to Support Small Businesses and Microenterprises" pp. 1-39 (2002).

Harmon, S., "GMAC Mortgage Offers Financing for Solar," GMAC Mortgage, 1999, Jul. 24, 2009, 3 pgs., http://www.resnet.us/ratings/overview/resources/gmac.htm.

Hayes, Sean, "Starter-Interrupt Device is the New High-Tech Repo Man", 4 pgs (Jun. 19, 2006).

Kistner and Price. Financing Solar Therman Power Plants. National Renewable Energy Laboratory. Apr. 11-14, 1999. p. 1-8.

Paul A. Cillo & Harlan Lachman, Energy Efficiency Institute; Daniel Rosenblum & Fred Zalcman, Pace Energy Project "Potential for Development of Pays in New York State" pp. 1-18 and Appendices pp. 1-11 (Aug. 3, 2005).

Personal Property Foreclosure, Chapter 3, Civil Benchbook, pp. 121-136 (Rev. Jul. 1, 2003).

PG&E, Services for Medical Baseline and Life-Support Customers, 1 pg (copyright 2007).

PG&E, Tariffs, 2 pgs (copyright 2006).

Samuelson, Pamela ,Legally Speaking: Embedding Technical Self-Help in Licensed Software (Published in Communications of the ACM 40(10): 6 pgs) (Oct. 13, 1997).

Selco Solar Lanka Limited, Sri Lanka; 2003, pp. 1-5.

Speizman Industries Receives Notice of Default from Lender. PR NewsWire. Feb. 17, 2004 p. 1-2.

Starke and Starke, "Mortgage Lending and Investing: Understanding Risks in a Changing Market," 1991, pp. 1-2.

Sun Edison website (2006), As viewed on the internet archive, http://web.archive.org/web/20060307151552/www.sunedison.com; pp. 1-7.

The Nikkei Weekly (Japan), "Due Diligence on Property Prices," Oct. 12, 1998, pp. 1-2.

Title 9-A Maine Consumer Credit Code, 2 pgs, (Oct. 31, 2006).

White and Summers, "Uniform Commercial Code"; 4th version, West Publishing Company, 1995; pp. 1-38.

Presta. Underwriting Fee Schedule 2005. As viewed at http://web.archive.org/web/20051127063731/http://www.prestaappraisal.com/fee.php.

Madison Gas and Electric, "Solar Basics", http://www.mge.com/environment/solar/solarbasics.htm., Jul. 18, 2006, pp. 1-3.

OnGrid Solar, "The OnGrid Solar Financial Analysis Tool User Manual Version 3.0", Updated Feb. 27, 2007, pp. 1-35.

Ohio Department of Development Clean Power Estimator, Ohio Department of Development, http://www.clean-power.com/ohio/, Aug. 9, 2006, pp. 1-3.

* cited by examiner

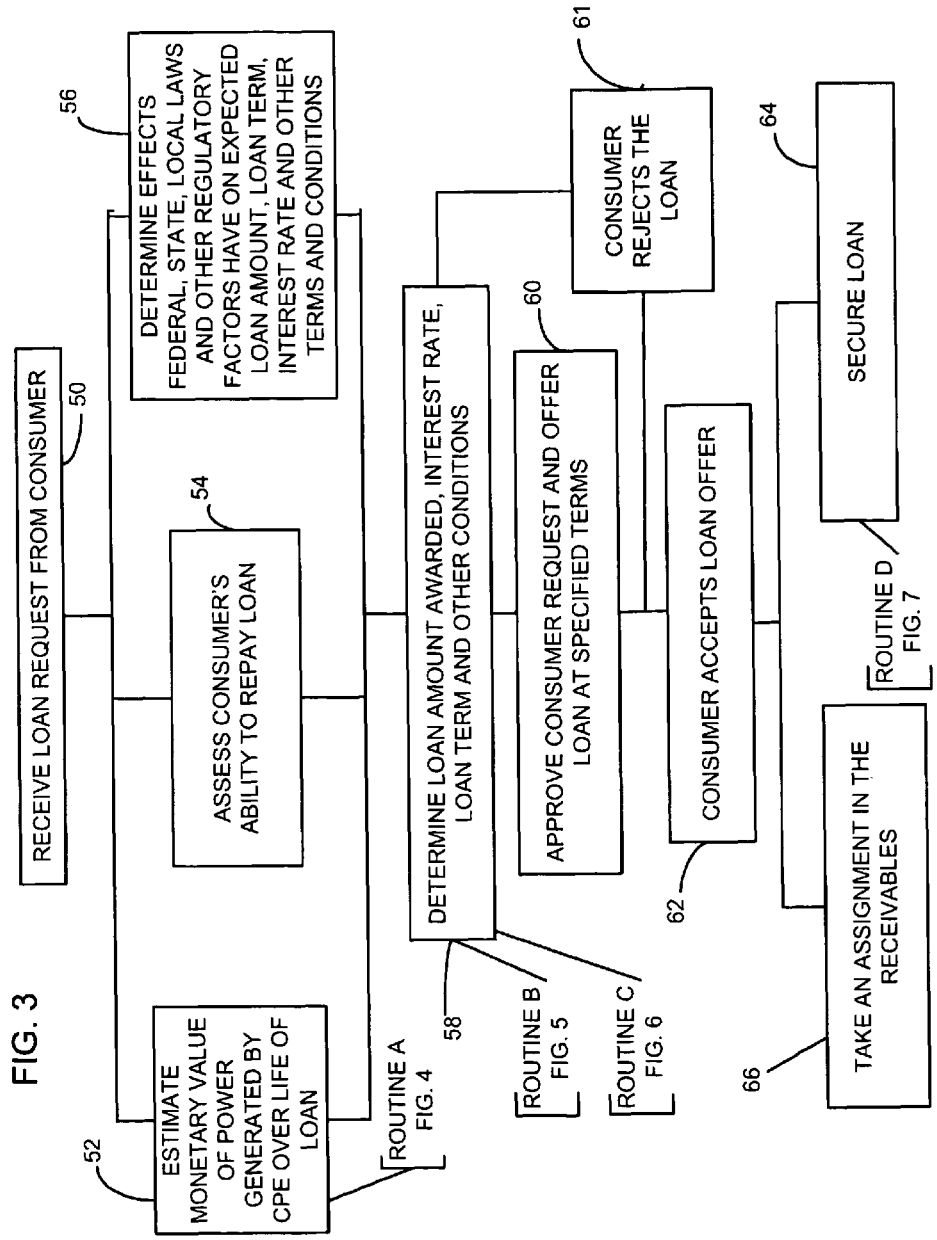

BILLING AND PAYMENT METHODS AND SYSTEMS ENABLING CONSUMER PREMISES EQUIPMENT

CROSS-REFERENCE TO RELATED APPLICATIONS

The present application claims priority under 35 USC §119 (e) to Kremen's U.S. Provisional Application Ser. No. 60/853,050, filed Oct. 17, 2006, which is incorporated herein by reference. The present application is related to Kremen's concurrently filed U.S. applications, (1) Ser. No. 11/653,052, entitled: BILLING AND PAYMENT METHODS AND SYSTEMS ENABLING CONSUMER PREMISES EQUIPMENT, (2) Ser. No. 11/654,043, METHODS FOR COST REDUCTION AND UNDERWRITING CONSIDERATIONS FOR FINANCING RENEWABLE ENERGY CONSUMER PREMISES EQUIPMENT (CPE), (3) Ser. No. 11/652,712, METHOD FOR UNDERWRITING THE FINANCING OF SOLAR CONSUMER PREMISES EQUIPMENT, (4) Ser. No. 11/653,044, SYSTEMS AND METHODS OF REDUCING FINANCING COSTS FOR RENEWABLE ENERGY CONSUMER PREMISES EQUIPMENT, (5) Ser. No. 11/653,325, METHODS, SYSTEMS AND FINANCIAL INSTRUMENTS FOR FINANCING RENEWABLE ENERGY CONSUMER PREMISES EQUIPMENT, which are all incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

FIELD OF THE INVENTION

The present invention relates to financing consumer equipment that generates power (electricity) from a renewable energy source and is located on a consumer's premises.

BACKGROUND OF THE INVENTION

Electricity or power (hereinafter used interchangeably unless otherwise noted) is an essential part of modern life. In residences, businesses, in institutions and in other locations, electricity is used in numerous ways by the consumer or end user (hereinafter "consumer").

Power plants generate electricity that is delivered by utilities through a network of transmission and distribution lines. This network is hereinafter referred to as the "power transmission and distribution grid," "the electric grid," "the grid" or "power grid." In general, a power system includes a power plant, power transmission and distribution grid (including appropriate transformers for stepping up and down the voltage as required) and the consumer's power (i.e., electricity) equipment residing on the consumers' premises (real property).

The demarcation line between the power grid and the consumer location is typically the electric meter, which is owned by the utility and the main circuit panel, which is owned or controlled by the consumer. FIG. 1 illustrates an example of a prior art power system.

As discussed, power plants generate the electricity and transmit and distribute it via the power grid. These power plants generate electricity based on different sources of energy. Such sources include, but are not limited to, fossil fuels (e.g., coal, natural gas or refined oil products), nuclear energy and renewable energy sources such as water (hydroelectric power), wind, biomass and solar energy (hereinafter "renewable energy sources"). Individual consumer power usage or consumption is measured with a power meter (or "meter"). The meter measures watts, which is a unit of energy or power. A watt is voltage multiplied by current. (While there are differences in the definitions of watts for both AC and DC power, the units of measure for both (watts) are treated similarly for purposes of this application.) A Kilowatt is 1,000 Watts. The meter also measures Kilowatt-hours (KWH), which is usage of power or energy over time or the kilowatts being used times the number of hours used. Most consumers pay electric rates based on KWH units.

The entities that purchase, sell or market power may vary. In general, these are referred to as utilities. In addition, these entities may be a not-for-profit municipal entity such as the Franklin Municipal Power and Light (electricity provider in the City of Franklin and parts of the City of Suffolk, Southampton and Isle of Wight, Va.) or Henderson Municipal Power & Light or HMP&L (owned by the City of Henderson, Ky.) an electric co-operative owned by its consumers such as Central Wisconsin Electric or Northern Virginia Electric Cooperative (NOVEC), a for-profit company owned by stockholders such as Pepco Holdings, Inc. or Dominion Virginia Power (often called an investor-owned utility).

However not all utilities own their own electrical generation equipment: distribution companies and retail services may sell power to consumers. Examples of power marketers include Green Mountain Energy or Duke Energy Marketing Corporation. Some federally owned or affiliated entities also purchase, sell, or market power. Examples of federally owned entities include Bonneville Power Administration (BPA) or the Tennessee Valley Authority (TVA). Other sources of electricity may include other utilities, power marketers and independent power producers (IPPs). IPPs, such as Calpine Corporation or certain members of the Independent Energy Producers generate electricity and then sell their power in wholesale markets (such as California's PX). Any entity that purchases, sells or markets power to (or from) the consumer of power or has the primary relationship with that consumer is for the purpose of this application known as a utility.

The origin of the electricity used by the consumer may also vary. Utilities may generate, transmit and distribute all of their own electricity. Alternatively, utilities may purchase power on the wholesale market from other sources off the transmission lines. The wholesale market is a place in which power is bought and sold by entities that sell electricity to the consumer. Alternatively, the utilities can source (i.e., purchase) electricity from smaller residential, business industrial, commercial and institutional users of electricity that have the means to produce the electricity (for themselves) and sell any excess back (known as buyback) to their utility. Regulators regulate the price and terms of these buybacks transactions.

All electricity generation, transmission, distribution, purchases, trading, marketing and sales are generally regulated by two authorities: The Federal Energy Regulatory Commission (FERC) and the State Public Utility Commissions (PUCs). The Federal Power Act of 1934 as amended created FERC and has jurisdiction over interstate transactions and facilities as well as wholesale sales. The PUCs have jurisdiction over intrastate trade of electricity and regulate retail rates for consumers, approve sites for generation facilities, set buy-back prices and terms from smaller, localized producers and issue relevant environmental regulations. Some States or their PUCs (to be used interchangeably in this application) allow deregulation of retail prices, the introduction of competition between utilities and the buying, marketing and selling of power within the State.

Pricing of electricity can also vary greatly depending on the regulatory authority that regulates the source of the power. A consumer's bill is based on many factors including, but not limited to the price per Kilowatt-hour and the amount of Kilowatt-hours consumed or used by the consumer for a given time period that the bill covers. In addition to the Kilowatt-hour charge, there are other extras included in an electricity bill such as state and local taxes, and other costs. Such other costs include, but are not limited to, equipment maintenance costs, depreciation of generation and distribution equipment, transmission costs, decommissioning costs for nuclear plants, retail and wholesale competition, weather, subsidies of varies types, etc.

Daily demand for electricity is usually highest in the afternoon and early evening (on-peak). Consumers may pay different prices during different parts of the day (collectively known as "Time of Day usage pricing" or "Peak pricing"). Seasonal peaks are caused by regional weather and climatic conditions. The highest usage seasonal peak usually occurs in the summer when air-conditioning use is greatest. The price per Kilowatt-hour for electricity (power) may also change depending upon monthly (or other time period) cumulative usage (tiered pricing) as well as time of day considerations. In this way, pricing increases in "steps" as usage increases. In other words, the greater the electricity consumption, the greater the increase in price per Kilowatt-hour charged to the consumer. The rise in price will increase beyond a baseline usage level. A baseline level is the minimum price charged for electricity for low usage levels. The baseline level, like many other issues involved in energy, is set taking into account public policy issues and usage patterns.

Consumers face price increases for electricity over the long-term, net of any increases due to inflation. Electricity prices have steadily increased over the long-term (with decreases and increases in short-term periods). For example, residential electricity prices were predicted to increase by 10.2 percent in 2006 compared with 2005 because the cost of fuels for electricity generation have risen and retail electrice price caps have recently been loosened in some States, particularly in New England and South Atlantic region, as a result of restructured electricity markets.

While an increase in an electric bill is unfortunate for consumers, an increase in the demand for electricity has a more disastrous consequence. The long-term demand for electricity is projected to increase. For one thing, the use of power consuming devices such as air-conditioners and computers has increased. Temperatures appear to be increasing globally. An increase in demand requires an increase in electricity production. The production often times places a strain on existing power plants. Building new power plants is expensive and subject to strict environmental review and widespread opposition. Consequently, there is a need for alternate sources of energy to supplement existing sources. Renewable power sources are one such source. In fact, renewable energy sources are quite desirable.

Specifically, renewable energy sources cause less environmental harm than non-renewable sources of power and are therefore socially and politically acceptable energy sources. There are large organizations and powerful figures that believe the exploration for and the pollutants produced by fossil fuels are destroying the environment. Nuclear electric power generation has opponents that are concerned about radioactive waste disposal as well as nuclear proliferation issues. Renewable electricity development is therefore a priority in many circles for these reasons alone. Some consumers will pay premium prices for electricity derived from renewable energy sources just on the basis of it helping the environment.

In addition, renewable, local energy generation is useful to generate power for back-up purposes in the event the utility sources are terminated (e.g., because of an outage or an arrangement with the utility. For example, under certain arrangements, the utility will terminate power supply to specific consumers during peak hours or cases of demand exceeding supply capacity. The consumer will receive discounted power rates for such concessions. This is called an interrupted power contract.

Smaller renewable energy sources are also advantageous because they generate energy locally (i.e. not at a centralized power plant). Local energy generation reduces strain on a utility power grid. The utility power grid is almost universally underinvested. Therefore, the grids are unable to respond to demand. While new grid infrastructure is required to meet such demand, the reality is new infrastructure is expensive and hard to get approved. The general population resists the construction of this new infrastructure. The prospect of additional transmission lines and other electrical components adjacent to home dwellings and office buildings poses real or perceived safety concerns.

Even with population approval, infrastructure will continue to face an uphill battle. To obtain proper approval, a request must endure a complicated and time consuming political process (e.g., passing through a maze of Federal, State and local government offices). For these reasons, local power generation is not only good public policy, but an effective means to avoid a political process in which additional power infrastructure projects are subject to endless investigative processes to determine the purpose and need to develop environmental impact statements. Suffice it to say, renewable, localized energy sources are quite advantageous and desirable.

Local solar energy is one of the more desirable renewable sources of energy. For one thing, solar energy can essentially be harnessed in most locations with solar access. For another, solar equipment consumes no fossil fuels and generates no air pollutants. The use of solar equipment is generally regarded as environmentally safe. In addition, there are direct financial motives for investing in solar energy for electricity production that complement any consumer personal or public policy considerations. Utilities in many States are required (or voluntarily do so) for public policy reasons to credit or actually buy excess solar electricity generated by the consumer. Specifically, some States require utilities to derive a portion of their sales from renewable energy sources. Consequently, if the utilities cannot satisfy this requirement, then they must purchase the electricity from other suppliers such as an IPP or from consumers with solar equipment.

In some States, consumers are paid for surplus power (electricity) generated (as opposed to credits that can only be applied for limited future use such as in California). Such payments are usually in the form of certificates or could be actual cash payments. For example, New Jersey has a Solar Renewable Energy Certificate program ("SREC"). According to New Jersey's SREC program, the utility will issue a SREC for every 1,000 KWH that a grid tied solar system generates. The SREC can then be sold or traded independent of the power (typically via a broker or aggregator). New Jersey's SREC Program assists in the sale of SRECs to electric suppliers that are required to invest in solar energy purchase of SRECs. New Jersey's purchase requirement is expected to increase each year. It is projected that New Jersey's SRECs' equivalent will total 90 million watts (MW) of solar electricity in 2009 (enough to power 8,000 homes). In sum, the specific terms of payments and credits (i.e., net metering or dual metering as described below, certificates etc.) vary from State to State and utility to utility.

In addition to the financial benefits described above, State, Federal or other jurisdictions offer financial incentives that reduce the costs associated with the purchase, installation and sometimes the operation of solar equipment. For example, Illinois State offers a 30% rebate (up to a maximum $10,000) for the purchase of solar equipment. The State of California offers an incentive (rebate) of $2.50 per watt of new capacity purchased (amount of rebate to change over time subject to certain caps and other conditions). In general, the incentives vary by State. Federal law also offers certain tax credits for the purchase of solar equipment. Note that solar energy is one type of renewable energy. That is, other renewable energy sources may be eligible for rebates, credits, subsidies and other favorable treatments (as discussed below). (This application applies to all other renewable energy (and non-renewable) sources.)

One problem with some of the rebates or credits is that they are not received at the same time the equipment is purchased. For example, the California solar credit/rebate is received up to six months after certified installations.

In order to receive these benefits, solar equipment typically must be properly connected to (i.e., integrated) the power (electricity) grid of the local utility in accordance with utility rules. This is known as on-grid, grid-tied, utility-interactive (UI) or grid inter-tied solar equipment or systems. These systems generate solar power and route it to the power grid. The solar power (electricity) offsets consumer electrical consumption and, in some instances, even turns the electric meter backwards by routing unused power onto the grid to supply other consumers. In many States, the utility actually credits a homeowner's account for excess solar electricity produced. This amount sometimes can be applied to other time periods when the system produces less or in time periods when electrical consumption is greater (the electricity at times may be used as a credit or may be lost in a given time period as dictated by the States). This credit arrangement is called net metering or net billing which will be discussed in more detail below. The pricing for such credits might be the wholesale price of the electricity or some other pricing dictated by the individual States' PUCs. These credits can substantially reduce or eliminate an electricity bill.

While the Federal and State incentives described above are significant, the remaining costs for the purchase of solar equipment may be beyond the amount of cash a consumer has on hand or wishes to commit. For consumers that wish to displace 75% of the consumer's electricity consumption, for example, the cost for the purchase of a solar system can actually reach $60,000 or more. On average, residential yearly consumption ranges from 2,000-5,000 Watts. The price of the purchase of solar systems (photovoltaic cells, inverters and other auxiliary equipment) is estimated at $9 per Watt. Consequently, the total cost (on average) of such equipment ranges from $18,000-$45,000. In Illinois for example, a solar system designed to displace 75% of electricity consumption may cost about $30,000 ($45,000 less State rebates and grants). In San Diego, the purchase price of solar equipment is estimated to cost $20,160 ($37,800 less State rebates for 75% electricity displacement). These are only examples of the costs. The actual cost of the solar equipment or system may vary widely depending upon installation complexity, location, component availability, and the size of the installed system. Suffice it to say, the costs for purchase make solar equipment prohibitive for most consumers without financing. (A good analogy is the purchase of a new automobile. That is, most consumers would be prohibited from purchasing automobiles without financing options.)

There are several existing financing options for the purchase of solar equipment. These options are predominantly based on traditional financing products like a mortgage or deed of trust, as well as the less commonly used sale purchase contract or conditional sales purchase contract. While these financial instruments differ in legal structure, they are all methods for a lender to obtain a security interest (or lien) to secure their loan with the borrowers' real property. For the purposes of this application, these methods are collectively referred to as a mortgage, real property security interest or real property mortgage.

Real property mortgages are available in many flavors. For consumers that wish to purchase a new home or building there is the purchase money mortgage. For those consumers who renovate an existing home or building there is an option of an equity line of credit or second loan. Mortgages are also available for consumers that wish to refinance their existing properties. However, these mortgages are not advantageous for the purchase of solar equipment. For consumer's intending to buy a new home, it would be difficult logistically to buy the property and the CPE simultaneously.

For consumers wishing to purchase solar equipment for an existing home, the consumer would apply for a second mortgage (or refinance the first mortgage or obtain a line of credit) in which the successful loan recipient may receive a loan. Second mortgages, however, will likely have higher interest rates because they are second in priority for collection security behind the first mortgage (from credit perspective). Lines of credit or home equity loans usually have commitment, annual, use, check issuance or cash advance, or other service fees, some of which accrue whether or not the line of credit is used. In all cases (first mortgages, refinances, second mortgages or lines of credit), the entire subject property would be used as collateral for the loan.

There are other disadvantages to mortgages as a vehicle for solar equipment purchase. In order to obtain a mortgage for real property, the consumer must provide proper information and documentation supporting the application including financial background such as assets, bank accounts, salary, loans, credit card debt and other debt. For new property, a down payment will be required which ranges from 0-30% of the purchase price. The consumer's debit to income ratio, loan to home value ratio, the consumer's credit information including the consumer's credit score (known commonly as a credit or FICO score) and other underwriting criteria will ultimately determine whether the consumer is awarded the loan, the loan amount and its terms. From the loan applicant's viewpoint, the process is time consuming with limited success in obtaining the loan unless the applicant satisfies the lender's detailed requirements.

In addition to those disadvantages, an applicant for a mortgage will typically be charged fees which are a subset of what is collectively known as closing costs. Examples of such closing costs may be found in Appendix A below. Even with advertised "no-fee" mortgages, the consumer/borrowers are charged the foregoing fees (in reality) in the form of a higher interest rate. All of these fees or charges are both considerable and economically impractical in view of the size of the loan request. There may be other costs including pre-payment penalties for loans that pay off existing loans.

There are other options for financing solar equipment. For example, a limited number of financial institutions or lenders offer another type of loan called an Energy Efficient Mortgage (EEM). The Environmental Protection Agency (EPA) offers a financing program with lenders to provide special financing for buyers of energy efficient homes. These financing options are similar to the mortgages described above, but such mortgages are offered to potential homeowners that wish to purchase a home or refinance a home that is energy efficient or will be energy efficient after energy saving equipment is installed. In some instances, an energy rating must be obtained to determine the cost-effectiveness of the improvements. See "The Borrower's Guide To Financing Solar Energy Systems, A Federal Overview," Second Edition, U.S. Department of Energy, 1999. In these arrangements, the lenders require similar financial information from the potential homeowner as described above and will perform the same analysis to determine whether the potential homeowner is worthy of the loan. In addition, the potential homeowner must submit additional information that supports a claim of energy conservation for the property or the lender will provide an evaluation as part of the closing costs for the loan.

In summary, while these financing options (mortgages) may be adequate, they are not optimal from the perspective of both the lender and the consumer (residential) borrower. From the viewpoint of a borrower, secured loans such as real property mortgages (of any type including home equity, home line of credit, or EEM) are difficult to obtain without the proper financial background. Borrowers must adhere to lender requirements and guidelines or pay more. In addition, new home loan borrowers must put down a substantial down payment or pay more in interest costs. As part of the loan application costs, borrowers must also pay for costs such as appraisals, title insurance, inspection fees, closing costs and escrow accounts. In view of the size of the loans needed for the solar equipment (e.g., $50,000), these costs do not make economic sense for the consumer as their average cost to obtain is in the thousands of dollars.

Lenders find mortgages equally suboptimal for financing solar equipment. In the event the borrower defaults on the mortgage, the lender must institute costly and lengthy foreclosure proceedings on the subject property. The process is not only time consuming and expensive, but the lender becomes an unwilling owner/possessor of the real property. These disadvantages affect secured lenders of all types regardless of the collateralized property (e.g., residential, business, institutional or other). The prospect of these costs and administration are high compared with the size of a loan needed to finance solar equipment, which might be $50,000 or more or as little as $10,000 or less. Suffice it to say, traditional mortgage financing does not fully meet the needs for lending for the purchase of solar CPE.

There are other secured financing methods for the purchase of solar equipment. For example, personal property loans or personal property security interest (sometimes referred to as chattel mortgages or chattel loans) are a type of mortgage that is secured by personal property instead of real property. In another words, a personal property security interest is a lien that provides a lender a security interest in personal property, as opposed to real estate (land, buildings) pledged as collateral for repayment of a loan. Personal property can be any kind of movable property, such as automobiles, jewelry, etc. A personal property security interest is normally used in financing consumer goods, such as household appliances; the lien terminates when the obligation is paid. Personal property interests are usually evidenced by a UCC (Uniform Commercial Code) filing at the Secretary of State or other government office in the State in which the personal property is located.

For non-business consumers, personal property loans or interests are disadvantageous for the purchase of solar equipment. The interest payments for personal property loans are usually not tax deductible on a federal or state level. This deprives the consumer of a very important economic benefit. In addition, the interest rates for personal property loans are typically higher because the subject property is personal, not real. The personal property can be removed from the lender's reach or made less valuable. Consequently, the loan is a greater risk for the lender (than a real property mortgage). In general, banking regulators much prefer mortgages for real property.

Further, when it comes to solar equipment, lenders do not know how to characterize such property for credit and loan purposes. Because of the intrinsic nature of solar equipment and the mechanism used to attach it to the subject real property, lenders do not know whether solar equipment constitutes "real property" (i.e., a fixture under the law) or personal property under the law. The particular characterization for the solar equipment will dictate, among other things, the proper location for recording or filing (perfecting the security interest). Real estate is recorded in the county office in which the property is located. On the other hand, personal property is typically filed at the office of the Secretary of State in which the personal property is located. Because of this confusion, the lenders are apprehensive about such loans. Such apprehension usually translates into higher interest rates with stricter restrictions.

Unsecured personal loans are another type of financing option for a consumer. They are also not an optimal choice for lenders and borrowers. Unsecured loans are typically not available at affordable interest rates for the vast majority of consumers because they do not have adequate financial background and the proper relationships with lenders to receive such a loan. Lenders are cautious about making unsecured loans because such loans are higher risk than secured loans.

There is another financing option available to the consumer. In this option, the installer of the solar equipment may float (or advance) a portion of the purchase price for solar equipment. The purchase price might also include the cost of installation. This is not attractive to the installer because they must pay many of these costs upfront. In most cases, the installers have limited working capital for such an expenditure. For this reason, installers rarely offer their own direct financing. If they do decide to offer financing, installers only offer very short-term financing. Distributors, dealers and manufactures do not even offer financing (credit) for consumer solar equipment purchasing.

There is no financing program or product available that is advantageous to lenders that wish to offer loans, and borrowers that wish to borrow money, for the purchase of solar equipment. It would be desirable to provide a method and/or system that would overcome the disadvantages described above with respect to the financing options for solar equipment.

SUMMARY OF THE INVENTION

The present invention teaches a variety of systems and methods enabling renewable energy consumer premises equipment (CPE) such as dual metering techniques. The present invention contemplates, among other things, supporting, by increasing a likelihood of meeting financing obligations, a consumer purchasing, leasing, installing and/or maintaining renewable energy CPE for power generation at a consumer premises. The renewable energy CPE may be attached to a structure on the consumer premises, disposed free standing on the consumer premises, or utilized through any other suitable means on the consumer premises.

According to one embodiment, a method of increasing the likelihood of repayment of a loan provided by a lender for the purchase of renewable energy consumer premises equipment (CPE) by a customer is disclosed. The method couples the CPE to a power grid operable to receive at least a portion of the power generated by the CPE, measures power generated by the CPE and delivered onto the power grid, and processes receivables associated with the power generated to an entity at times corresponding to power measurement to fulfill the customer's obligation to repay the loan. The processing can be accomplished by any suitable means such as distributing and/or securing the receivables.

Another aspect of the present invention contemplates a business method for increasing a likelihood of repayment of a loan, lease or other financial instrument provided by a lender for purchase, lease, installation, and/or maintenance of renewable energy consumer premises equipment (CPE) by a consumer. This aspect contemplates measuring excess power incrementally over a period of time generated by the CPE and delivered onto a power grid, and processing receivables associated with the excess power generated to the lender at increments corresponding to increments that the excess power is measured. This enables the customer to fulfill the customer's obligation to repay the loan, lease or other financial instrument through an entity.

Yet another embodiment teaches various methods for billing by an entity for financing renewable energy consumer premises equipment (CPE) installed on a consumer premises. Here the CPE is capable of generating power, and at times at least a portion of the power is consumed by a consumer associated with the consumer premises. According to one aspect, the present invention contemplates coupling the CPE to a power grid maintained by a second entity, distributing at least some of the power generated by the CPE to the power grid, giving a monetary value to the at least some power generated by the CPE and distributed to the power grid, and the second party making payment directly to the first entity for the financing of the CPE.

An embodiment of the present invention teaches various methods of financing at a purchase price the purchase of consumer premises equipment (CPE) suitable for installation by a consumer and power generation or power use reduction at a consumer premises. Related embodiments identify whether at least one credit is associated with the purchase and/or operation of the CPE by the consumer at the consumer premises. Other embodiments take into consideration both subtracting any associated credits from the purchase price of the CPE and reselling of the CPE at a market rate, net any remarketing costs, in case of a default by the consumer.

Further embodiments teach billing and payment systems for financing purchase, lease, installation and/or maintenance of a renewable energy consumer premises equipment (CPE) suitable for installation by a consumer and power generation at a consumer premises. According to related embodiments, the billing and payment system includes a power grid, a power measuring device, and a billing mechanism.

The power grid is typically operable to distribute power to the consumer premises, the power grid further operable to receive power from the CPE. The power measuring device is operable to measure power delivered to the consumer premises via the power grid, the power measuring device further operable to measure power delivered onto the power grid by the CPE. The billing mechanism is operable to determine on a periodic basis any excess value of power generated via the CPE over power delivered to the consumer premises via the power grid. The billing mechanism may also credit any excess value generated by the CPE to an entity that financed the purchase, lease, installation and/or maintenance of the CPE up to an amount owed by the consumer to the entity during a relevant period.

Another embodiment of the present invention teaches a variety of systems for enabling purchase, lease, installation and/or maintenance of solar power generation consumer premises equipment (CPE) suitable for installation by a consumer and for power generation at a consumer premises. According to these embodiments, the system includes a financing mechanism, a power grid, a power measuring device and a billing mechanism.

BRIEF DESCRIPTION OF THE DRAWINGS

The accompanying drawings, which are incorporated herein and constitute a part of the specification, illustrate embodiments of the invention, and together with the general description given above and the detailed description of the embodiments including the Appendices A and B given below, serve to explain the principals of the invention.

FIG. 3 illustrates a method of financing the purchase of CPE in accordance with an embodiment of the present invention.

DETAILED DESCRIPTION OF THE INVENTION

Figure 1:
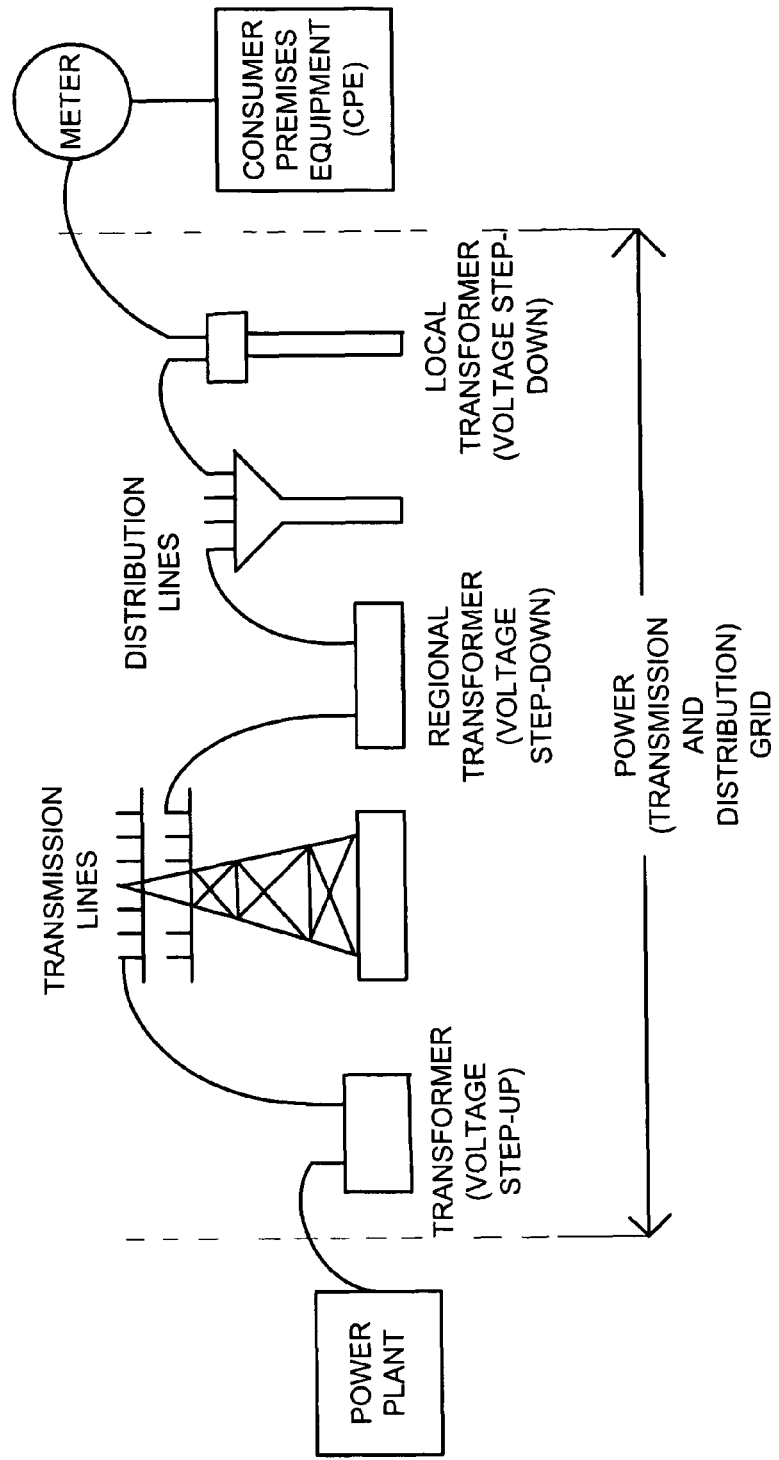
FIG. 1 illustrates a diagram of a prior art power system.

FIG. 1 is described above in the Background of the Invention.

Figure 2:
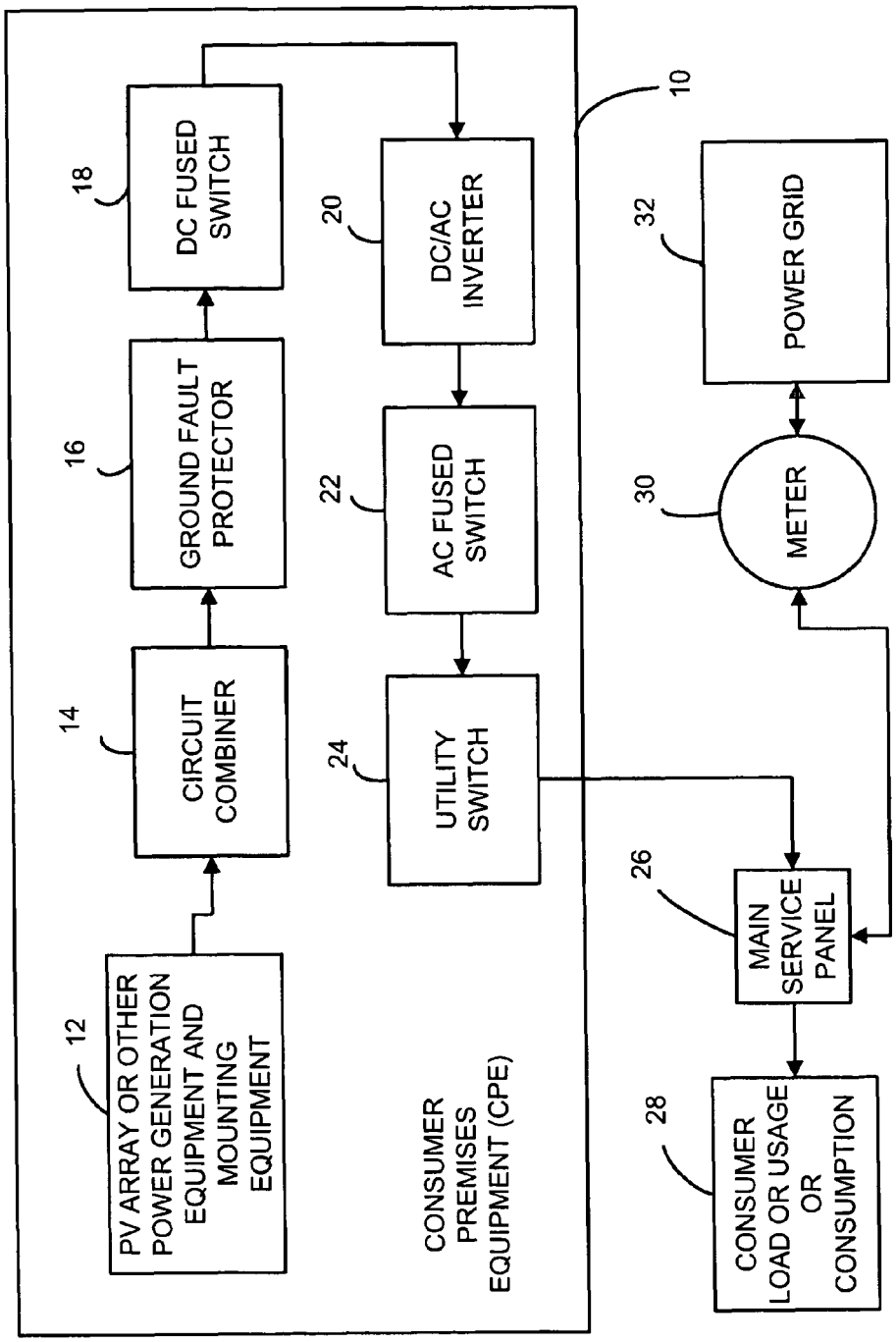
FIG. 2 illustrates a block diagram of a power system incorporating consumer premises equipment (CPE) for a real property structure.

FIG. 2 illustrates consumer premises equipment 10 (also known or referred to as "CPE," "renewable energy consumer premises equipment" and "renewable energy equipment") that resides on a residential building, but may alternatively reside on a business, institution or other real property. However, the CPE may reside near a building, business, institution or other real property. According to the embodiment of FIG. 2, CPE 10 incorporates renewable energy equipment that is used by the consumer for energy generation. In this embodiment, CPE 10 includes solar components as the renewable energy equipment (source). Alternatively, any renewable equipment may be used such as wind, biomass or water (hydroelectric) energy generation equipment as well as non-renewable energy sources. Many terms used herein and the definitions for such terms are set forth in Appendix B.

The solar components described herein are collectively known as photovoltaic ("PV" or "solar") equipment (or system). In general, there are two types of PV systems: systems that interact with the utility power grid with no battery backup capability and systems that interact with the power grid and include battery backup. In addition, there are other systems that do not interact with the grid. In the embodiment shown in FIG. 2, the PV system (equipment) interacts with the power grid 32 but does not include a battery backup. As a result, this system operates only when the utility is available. This PV system will typically provide the greatest amount of savings to a consumer per dollar of investment. However, the system will shut down during an outage, and will remain that way until utility power is restored. Note that the consumer is a homeowner or resident for this discussion, but may alternatively be a business, institution, entity or other user or purchaser of power (electricity).

CPE 10 comprises several components including a PV (photovoltaic) array 12 along with the appropriate mounting equipment. PV array 12 is made up of PV modules, which are an environmentally-sealed collection of PV cells. These cells convert the sunlight into electricity. Some of the most common PV modules are 5-25 square feet in size. Usually four or more smaller modules are framed together by struts called a panel. A panel spanning 20-35 square feet in area may be used for more easy handling on a roof. CPE 10 includes mounting and wiring systems used to integrate the solar modules into the electrical systems of a residence or alternatively a business, institution or other consumer.

CPE 10 includes (as part of the wiring system) PV array circuit combiner 14, ground fault protector 16, DC fused switch 18 and DC/AC inverter 20 connected in series. PV array circuit combiner 14 is connected to PV array 12. DC fused switch 18 is used as over-current protection for the solar (PV) modules. Ground fault protection 16 is a circuit breaker. Combiner 14 is used since PV array 12 (modules) requires fusing for each module source circuit. Some inverters alternatively include the fusing and combining function within the inverter housing. Inverter 20 is designed to take the DC power from PV array 12 and convert it into standard AC power used by devices that consumes standard AC power.

CPE 10 further includes AC fused switch 22 and utility switch 24 connected in series (and connected to DC/AC inverter 20). AC fused switch 22 is used as a disconnect (i.e., as an over-current protective device (OCPD)). Utility switch 24 is used by the utility to switch off PV array 12. Most utilities require a visible-blade, lockable open switch or disconnect in the inverter's output circuit. The utility switch 24 is usually located within sight of the service-entrance meter for ease of locating by emergency response people. It should be noted that CPE 10 may include additional components or fewer components than described herein depending on power and installation requirements.

The components of CPE 10 are connected to original components including main service panel 26, consumer loads or usage (or consumption) 28, meter 30 and a local segment of the utility power grid 32. Specifically, utility switch 24 is fused and is connected to main service panel 26. The maintenance service panel 26 includes among other things the residential circuit breakers. Main panel 26 is coupled to the residential wiring and loads 28.

Figure 2A:
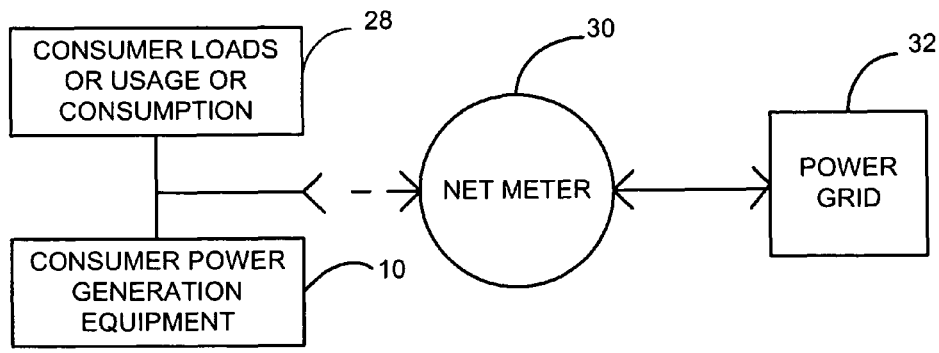
FIGS. 2A-B illustrates net and dual metering arrangements, respectively.

Meter 30 is coupled between power grid 32 and main service panel 26. Meter 30 is a device for measuring electricity consumption. In this instance, meter 30 is capable of net metering (or other alternative metering schemes discussed below). This is shown in FIG. 2A. CPE 10 is shown interconnected to power grid 32 to enable the consumer to feed any surplus or excess power (electricity) to grid 32. Meter 30 will spin forward when power (electricity) flows from power grid 32 into the residence and backward when CPE 10 (solar components) produces surplus electricity that is not immediately used. (For purposes of this application, power consumed will have a negative value and power generated will have a positive value. This convention, however, may be switched.) Excess power (electricity) is "loaded" on power grid 32.

Figure 2B:
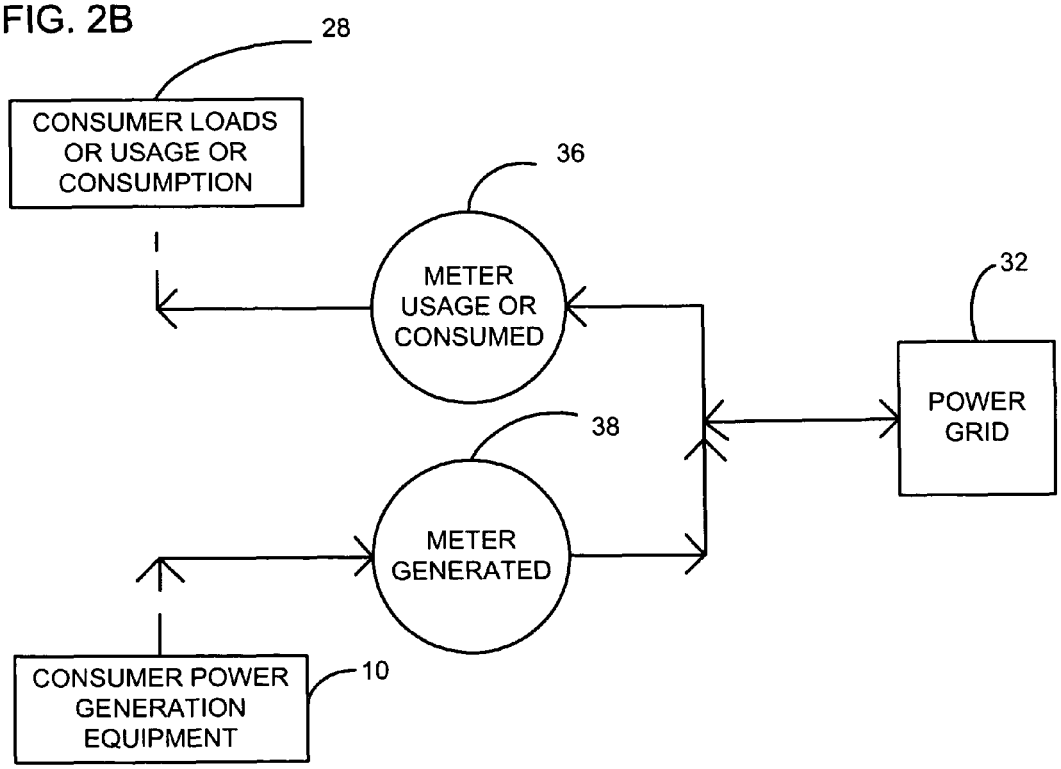

Utilities may require an agreement for consumers to qualify for net metering. This is known as net metering to those skilled in the state of the art. In alternative embodiments, there might be two separate meters as shown in FIG. 2B. Meter 36 is used as a measuring device for power consumed or used and meter 38 is used as a measuring device for power generated by the consumer's CPE. This "dual metering" convention may be desired by a consumer or required by a utility. This is because in some cases, the purchase price of power is different than the rate the utilities buy the power from the consumer.

The utilities may give credit or provide payment for excess electricity generated beyond power used by the consumer. In alternative embodiments, there may be two meters (as discussed above), one for forward measurement and one showing backward measurement. In this illustrative example, the consumer uses 1,000 KHW in the given time period. The consumer's CPE generates 1,600 KHW in the given time period. The price the consumer pays is $0.14 per KHW. The buyback price is $0.12 per KHW. Using net metering the consumer will receive a credit of $0.12/KHW*(1,000-1,600)=$72. Using dual metering the consumer will pay $0.14/KHW*1,000-$0.12* 1,600=$52. In other cases, the results will be different. The credit, payment or other quantifiable value for power generated by the CPE 10 is part of or known as "receivables" which will be described in more detail below.

Additional details of installation including factors effecting mounting, positioning, output and other related information are found in many power periodicals, papers and books including "A Guide to Photovoltaic (PV) System Design and Installation," Edecon Engineering, Version 1, Jun. 14, 2001, the contents of this document being incorporated by reference herein.

The average cost for a solar system in the U.S. is approximately $30,000. Solar equipment cost may be calculated using commercial software such as the assement tool marketed by Fat Spaniel Technologies. In addition, there are other web based tools available for calculations. A professional may also be used to determine the size and costs of solar equipment and installation. See "A Guid to Photovoltaic (PV) System Design and Installation," Edecon Engineering, Version 1, Jun. 14, 2001 or other articles on this subject for more details. The solar components or equipment of CPE 10 that is subject to or may be borrowed against (may be secured) includes PV array 12, circuit combiner 14, ground fault protector 16, DC switch 18, DC/AC converter 20 and possibly other components including the mounting equipment. Note that these components may be considered fixtures depending on implementation and local laws.

FIG. 3 is a high level flow diagram of one method of financing CPE 10 in accordance with an embodiment of the present invention. At step 50, a lender receives a loan or finance request from a consumer (borrower) for the financing of CPE 10. The consumer may submit an application for such a loan much like a consumer does for other types of loans. However, such information submitted will be abbreviated to reduce the administrative mortgage costs which make CPE harder to finance. (In certain embodiments, the general lending underwriting standards are modified and costs associated with the same are reduced for the reasons discussed below). The financing application may be received in many ways including a letter, website, email, phone and fax. As part of the financing application, the consumer may be required to submit limited financial and other information (e.g., name, social security or tax ID number, location of real property, authorization for credit information, type of loan desired, etc.) for evaluation. CPE 10 (e.g., solar components) requirements and limitations will also be determined along with the costs for such CPE 10.

Following step 50, several steps are executed in parallel, as shown, or may be executed in any suitable manner. At step 52, the monetary value of the estimated power generated by the CPE 10 over the life of the loan is determined. Details of step 52 are set forth in routine A shown in FIG. 4. Suffice it to say, the power estimated may be excess power as measured by a net meter 30 from FIG. 2A or gross power generated and measured directly off of the meter 38 shown in FIG. 2B. At step 54, the consumer's ability to repay the loan is assessed. The consumer's credit information including FICO® score are obtained. This credit information will be evaluated to assess whether the consumer will pay back the loan independent of the value of any collateral or cash flows. In addition to this assessment, the actual value for the CPE 10 may be determined. The rebates, credits, subsidies and any other benefits for the purchase of CPE10 may be taken into consideration. In addition to step 54, the effects of Federal, State and local laws as well as regulatory factors have on expected loan amount, loan term, interest rate and other terms and condition may be determined at step 56.

Federal laws such as the U.S. Department and Urban Development (HUD) rules must be reviewed for compliance (particularly if the loan is used to purchase real property). For example, HUD rules require a cool-down period in which the consumer/borrower may terminate the agreement without penalty. State laws must also be reviewed for compliance. For example, State usury laws must be reviewed to determine the specific rules and restrictions on loans and interest rates (for compliance). For example, California's usury and other laws regulate the loan of money and the interest rates employed. See Title IV-Loan, Ch. 3, Loan of Money, California Civil Code Section 1912-1916 and the California Finance Lenders Law of the California Financial Code. In addition, Federal, State and local anti-predatory lending laws that also protect the consumer/borrower for fraudulent, deceptive, discriminatory or unfavorable practices must be reviewed for compliance. The lender must also adhere to licensing laws for lending money to consumers.

Once steps 52-56 are completed, a loan or financing amount to be offered to the consumer is determined (calculated) along with the relevant interest rate, loan term and other conditions at step 58. The amount, interest rate and other terms and conditions take into account market interest rates and conditions, as described in detail with respect to routine B in FIG. 5. In addition, other factors relating to the CPE 10 are considered as described in detail with respect to routine C in FIG. 6. Any down payment by the consumer will also be taken into consideration.

As part of this determination, applicant information is verified. As for the loan, the terms may be for a fixed monthly term or a variable term based on a payment amount the consumer prefers (and is supported by their credit information). Other terms and rates may be used including fixed or variable interest rates based on market conditions for a given credit information. Down payments may or may not be required based on the credit information and other factors. The loan application process may be done entirely through the web in real or near-real time. Execution then moves to step 60 wherein the lender approves the loan and offers the loan to the consumer at the terms determined (from steps 52-58). The consumer may be notified of such approval in many ways including a letter, email message, via website, print out or other efficient means. At this point, the consumer has the option to either accept or reject the loan at the given terms (steps 61 and 62). If the consumer rejects the loan, the process may return to step 58 wherein the loan terms are recalculated (if the lender desires). Assuming the consumer accepts the loan at the terms offered at step 62, such acceptance shall be by execution which may include notarization. Execution may be in written or electronic/digital form.

Figure 7:
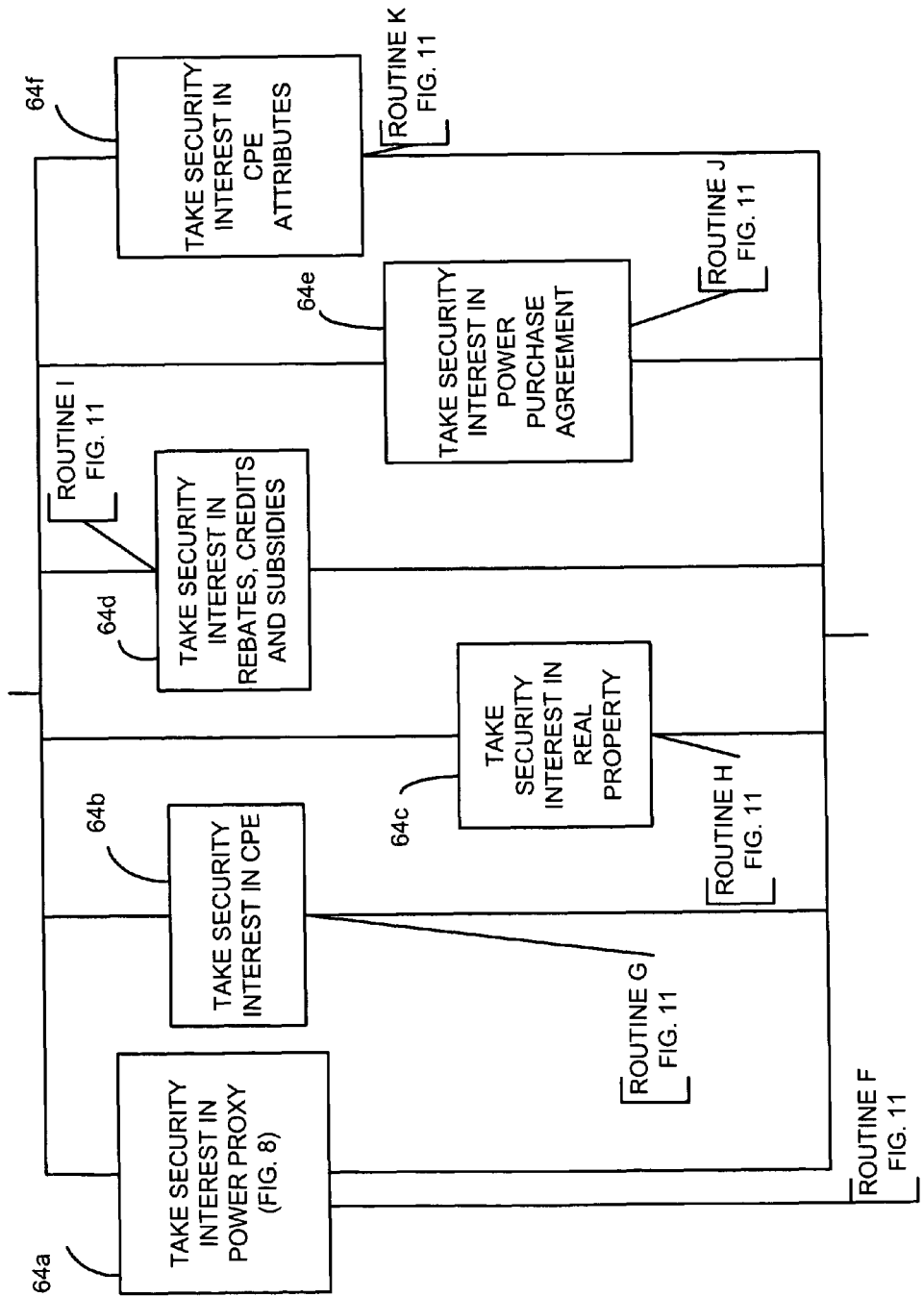
FIG. 7 illustrates routine D shown in FIG. 3.

Now, the lender wants to increase its chances that it will be repaid the full amount of the loan. To this end, the lender will secure the loan or financing at step 64 as described in routine D in detail (FIG. 7). In brief, the lender may secure the loan against a power proxy, the CPE, rebates, credits and/or subsidies, a power purchase agreement, real property, and/or a conditional sales contract (or power contract). Additionally or alternatively, the lender may take or receive an assignment from the consumer for the receivables (as described below) it receives for future power generated by CPE 10 (excess or direct power off of the CPE). This is accomplished at step 66. Alternatively or in addition, the lender may take an assignment in the other power proxy elements (besides the receivables as discussed below), power attributes and/or CPE attributes (discussed below), a power purchase agreement, power contract and/or a conditional sales contract.

Note that the method of FIG. 3 was described in terms of a loan for purchase. However, the present invention contemplates a variety of financing techniques for a variety of activities including purchase, lease, installation and maintenance of the CPE 10.

With respect to the "receivables" described above, many utilities are required to either credit a consumer's account (back meter) or pay a consumer for electricity generated by CPE 10 and delivered onto the power grid. 32. This payment may be in the form of a certificate, credit, money or other quantifiable value. For example, New Jersey offers SRECs for every 1,000 KWH of electricity. In March 2006, the cumulative weighted average price ($/MWH) ($ per 1000 KWH (1 MWH)) for an SREC was $201.98 on the open market. Therefore, the receivables include any valuable payment, instrument or other valuable consideration for the power generated by CPE 10. The receivables may be provided by a utility or other entity for power (electricity) generated by CPE 10 (and delivered onto a power grid 32).

Figure 4:
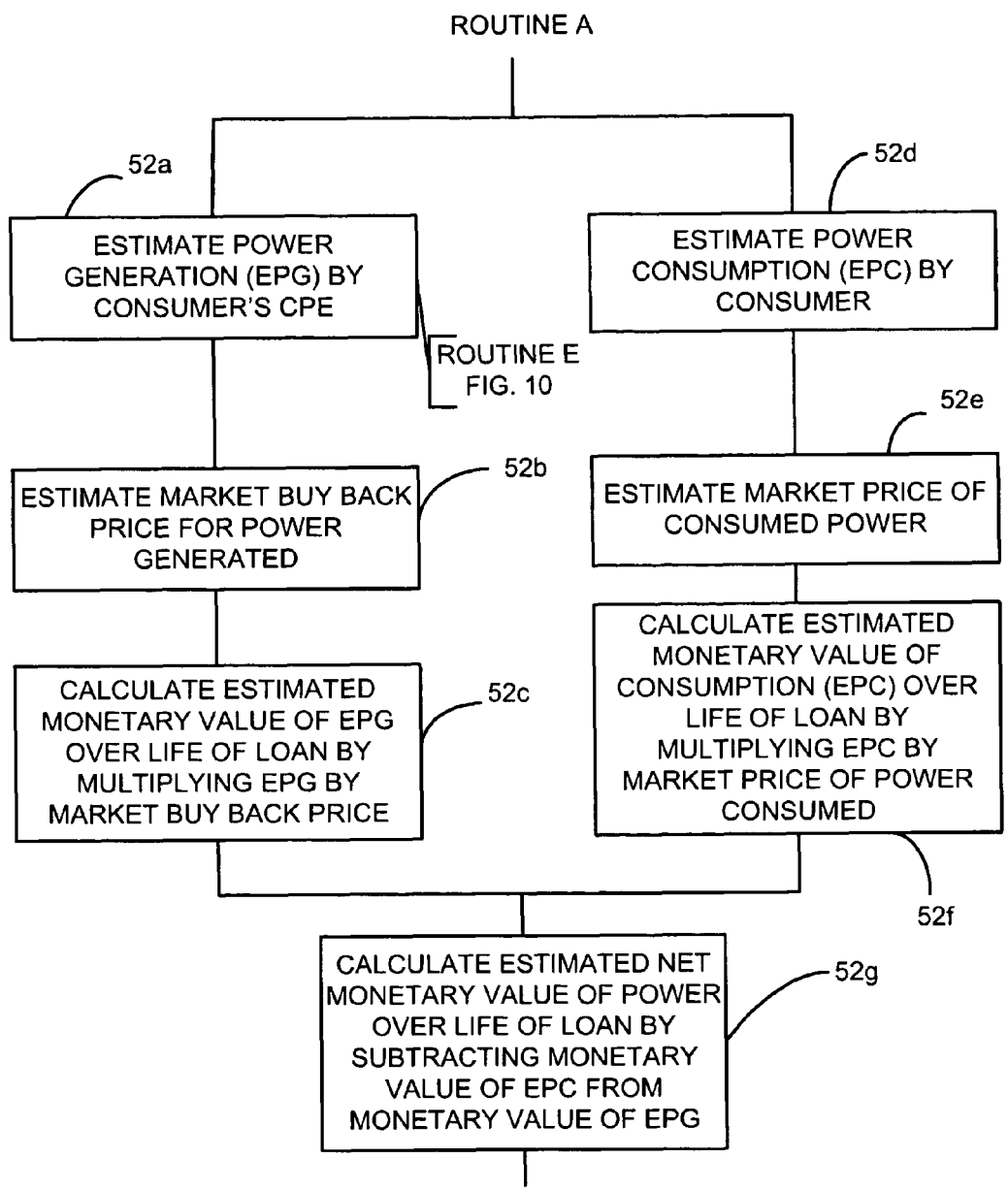
FIG. 4 illustrates routine A shown in FIG. 3

Referring to FIG. 4, the value of power (excess or direct gross power of the CPE 10) generated at step 52 of FIG. 3 is broken down in detail in routine A. As will be appreciated, the method (steps) of FIG. 4 is only one suitable embodiment for accomplishing the estimation of step 52. At step 52a, power generated by CPE 10 is estimated (estimated power generated is referred to as "EPG"). 52a may be accomplished through any suitable process such as by the steps in routine E shown in FIG. 10.

Figure 10:
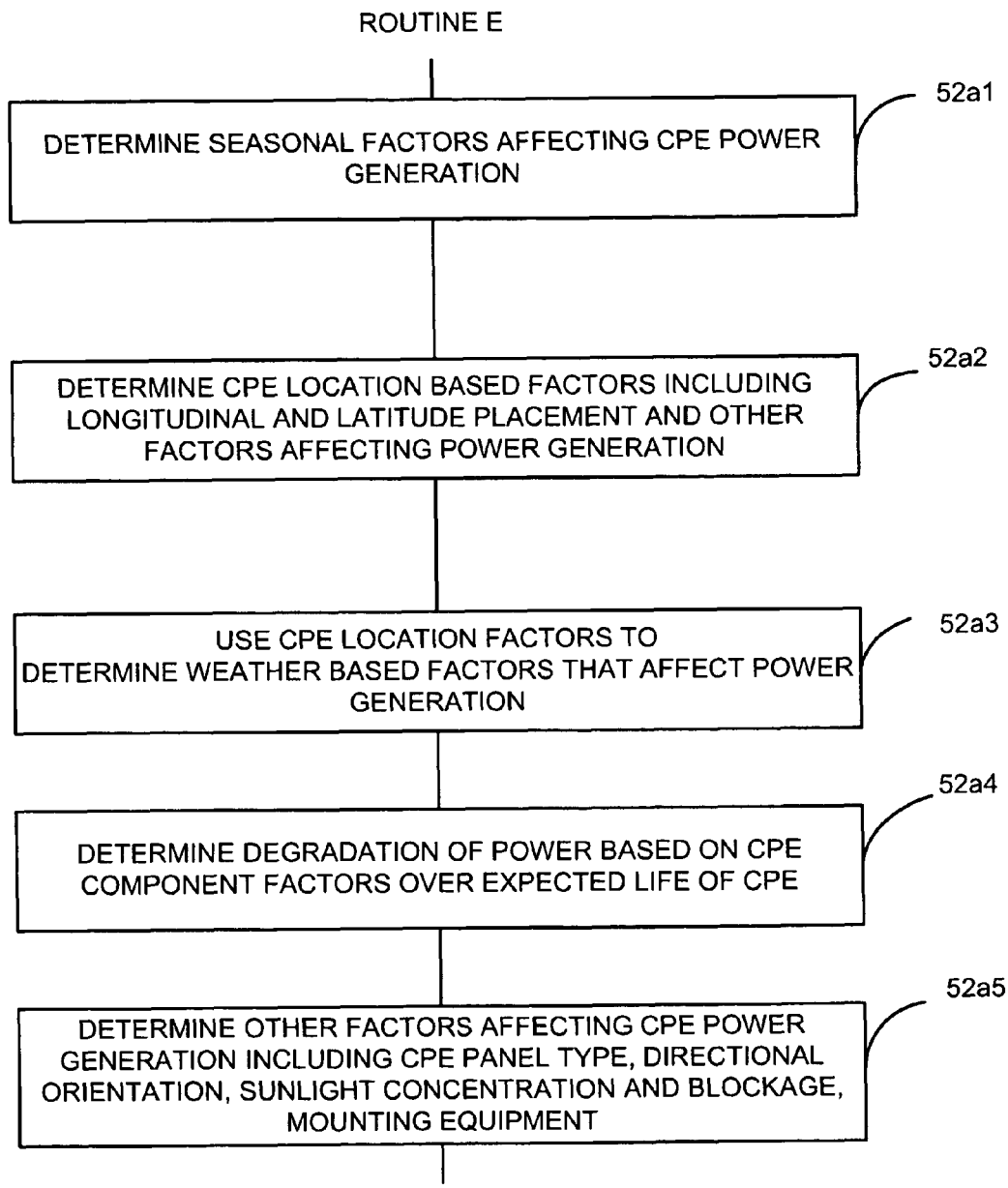
FIG. 10 illustrates routine E shown in FIG. 4.

Turning to FIG. 10, seasonal factors affecting CPE 10 power generation are determined at step 52a. In brief, the seasonal strength of sunlight and length of sunlight hours affect estimated power generation by CPE 10. These factors vary throughout the year (by season). Estimated power generation typically peaks during the summer and dips lowest during the winter. In some cases, this graphical function may be inverted (colder weather sometimes increases the power generation). However, power generation depends on the angle (orientation discussed below) of the solar equipment (panels) as well as the weather conditions at the particular location.

Continuing with FIG. 10, Execution moves to step 52a2 wherein the CPE 10 location based factors affecting seasonal power generation are determined. The longitude and latitude placement of the CPE structure are factors that will be considered (or alternatively the zip code that can be translated into longitude and latitude). At step 52a3, the CPE 10 location based factors are used to determine weather based factors that affect power generation. That is, the specific placement of the CPE will affect power generation. For example, the CPE may generate greater power in the winter than in the summer depending on the particular placement (attachment) of the CPE 10.

With further reference to FIG. 10, at step 52a4, the degradation of power (based on the components of CPE 10) is determined. In other words, the efficiency of CPE 10 over the life of the CPE 10 is determined. Typically, efficiency decreases over the economic lifetime of the CPE 10. Many solar systems are warranted by their manufacture at their rated generation capability for 10-20 years (factory guaranteed output rating). With some CPE, the initial efficiency may be located above the manufacturer's rated capacity (100%). Average efficiency for CPE 10 will likely decrease over time. There are also industry standards for degradation that may be considered in place of the manufacture's warranty. Also note that different system components may have different degradation rates and lives. These factors are also considered. Following step 52a4, other factors affecting power generation are determined at step 52a5. Such factors include panel type and the directional orientation of the CPE 10 (including degree of roof slope). The directional orientation includes the angle measure with respect to horizontal, vertical, or other reference plane such as ground or the surface on which the CPE is positioned. These factors also include sunlight concentration striking the CPE (due to water reflection, presence of concentrators or concentrating photovoltaics and/or coatings for example), sunlight blockage (e.g., a bush, tree, building, presence of residue of films of materials deposited from the air or from water and/or other element obstructing light from striking the CPE 10), expected sunlight at the CPE 10 over a given period of time and/or generation capacity of the CPE 10. There are other considerations affecting power generation including temperature limits of the solar modules, dirt, dust and plant material accumulation, mismatch and wiring losses, and DC to AC conversion losses.

If the factors in 52a1-5 are taken into consideration, estimated power generation can be determined accurately enough for lending purposes. See "A Guide to Photovoltaic (PV) System Design and Installation," Edecon Engineering, Version 1, Jun. 14, 2001 for additional factors and their effect on CPE generation. Of course, those skilled in the art will recognize that certain of these steps may not be included in the process, and/or may be performed optionally on a case by case basis.

Returning to FIG. 4, following step 52a, the market buy back price (sold back to the power grid) for estimated power generated (EPG) is estimated at step 58b. In general, the buy back price will vary with the region, utility and market trading for power. In one example, market price may be maintained at a relatively high value for a given period of time and decreases to a low value. The price mildly increases following that decrease. In another example, market price may appear as a linear function over time wherein the market price steadily increases over time. See futures markets for power and discussion below. In sum, the buy back price may vary over time. The buy back price may be based on current market prices, scheduled PUC prices, future estimate market prices, wholesale prices, the amount of the power generated, timing of the power generated, and/or location of power generated.

Then, at step 52c, the monetary estimated value of the EPG by CPE 10 is calculated over the life of the loan by multiplying the EPG by market buy back price. This calculation may be performed using an equation such as (or alternatively another similar equation):

$$\$EPG = \int_0^t (EPG_t \times PG_t)dt$$

where "EPG" is the estimated power generated at a specified "t" time and "PG" is the buyback price of the power ($/KWH) at a given time "t". Following this calculation, execution moves to step 52d wherein estimated power consumption (EPC) is determined. EPC varies constantly because demands vary constantly due to changing consumer usage. Current usage (or consumption) is affected by the number and type of devices used by the consumer. For purposes of calculation, estimated consumption may be a fixed average value or varying values based on historical usage, cost of living, by location or other factors.

At step 52e, the market price (purchase from power grid) of power consumed is estimated. The market price of power will also vary and will depend on the geographical region, the entity selling the power, the arrangement (non-interruptible or interruptible contract) and time of day of use. Any given utility for example may set prices differently per season. In one example, the utility price for usage may remain constant over a period of time. Alternatively, the price may change based on a tiered (i.e., stepping) scheme over a given time period for a specific utility. California is an example of a State in which such a pricing scheme is used. In particular, usage price steps up incrementally after a certain amount of usage (over time).

In yet another example, utility price (daily) point may be lower during off-peak periods. However, the price jumps to a higher level during peak periods of usage. Note that there might be more than one peak or non-peak rate. In yet another example, a different pricing scheme exists for consumers under "non-interruptible" and "interruptible" arrangements with a utility. In particular, the price per KWH is higher (for some real market prices) for consumers that do not accept interruptions in usage during peak usage periods. Alternatively, for consumers that accept interruptions in power (due to peak usage, transmission congestion or other factors), the utility prices are substantially lower.

Rates are typically determined by the applicable regulatory agencies (PUCs) over a large period of time (e.g., 10 years or 20 years). The pricing component or gradient may be based on the consumer price index (CPI) for energy or may be derived from the futures commodity market for electricity proxies such as Dow Jones electricity indexes or natural gas futures market or other. IN addition, any length of time may be used that is sufficient to enable the lender to determine long range pricing. (Price for power has historically increased 2-6% per year.) It is important for the lender to consider long-term pricing of power. While pricing is normally set by the PUCs, they will tend to mirror the projected long-term futures market for energy. Such information will help determine whether the customer can afford the repayments over the length of the loan. That is, the lender will determine whether there will actually be cash flow back to the lender over the long-term.

In sum, the consumer pricing scheme may be based on scheduled PUC prices, current market prices, future estimated market prices, the presence or an absence of an interruption contract, the amount of power used, location of power used and/or the timing of the power used.

At step 52f, estimated monetary value of consumption (EPC) is calculated over the life of the loan. This calculation may be accomplished using the equation (or alternatively a similar equation):

$$\$EPC = \int_0^t (EPC_t \times PC_t) dt$$

where "EPC" is the estimated power consumption in dollars at a given time "t" and PC is the purchase price of power (from the utility or other entity that sells power) at a given time "t."

Now, once the monetary values for EPG and EPC are calculated, the estimated net monetary value of power is calculated at step 52g in FIG. 4. This calculation is accomplished by the equation:

$EPG-EPC$=Net value for excess power.

This value will be used to determine the financing or loan amount awarded and other financing or loan terms.

Figure 5:
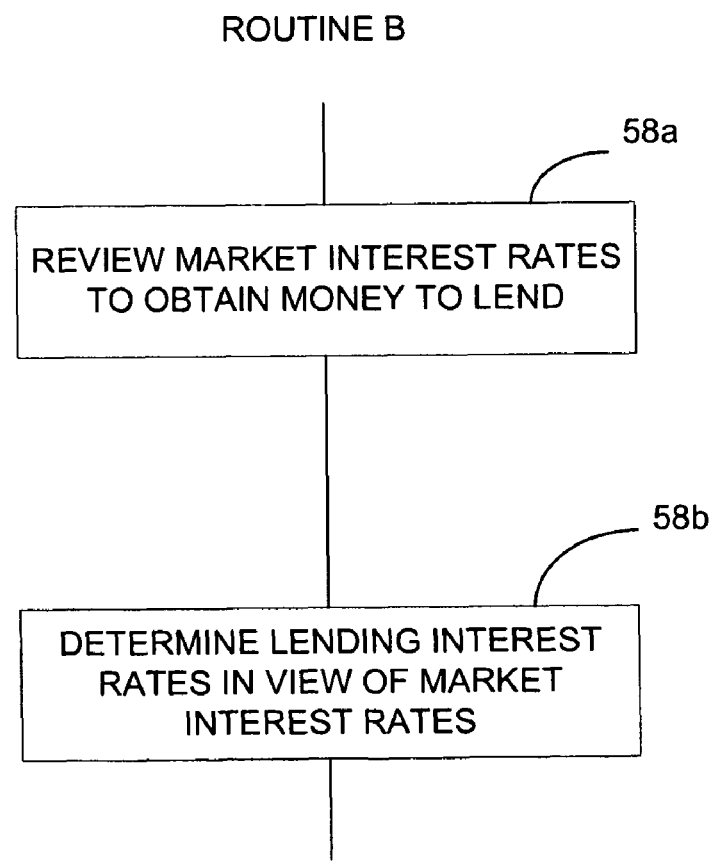
FIG. 5 illustrates routine B shown in FIG. 3.

As described above, the loan amount awarded, interest rate, etc. are determined at step 58. As part of that determination, the routine B shown in FIG. 5 is performed to accomplish this task (along with information of steps 52-56). In particular, the lender shall continually review current market rates at step 58a to determine the rate at which the lender may borrow money. Such information will be obtained from a database of current market rates. The rate at which the lender may borrow will ultimately allow the lender to determine the rate at which the lender may then lend money to a consumer. At step 58b, the lender will determine the proper interest rate for the loan provided to the consumer based on the market interest rates for obtaining the money to loan the consumer.

Figure 6:
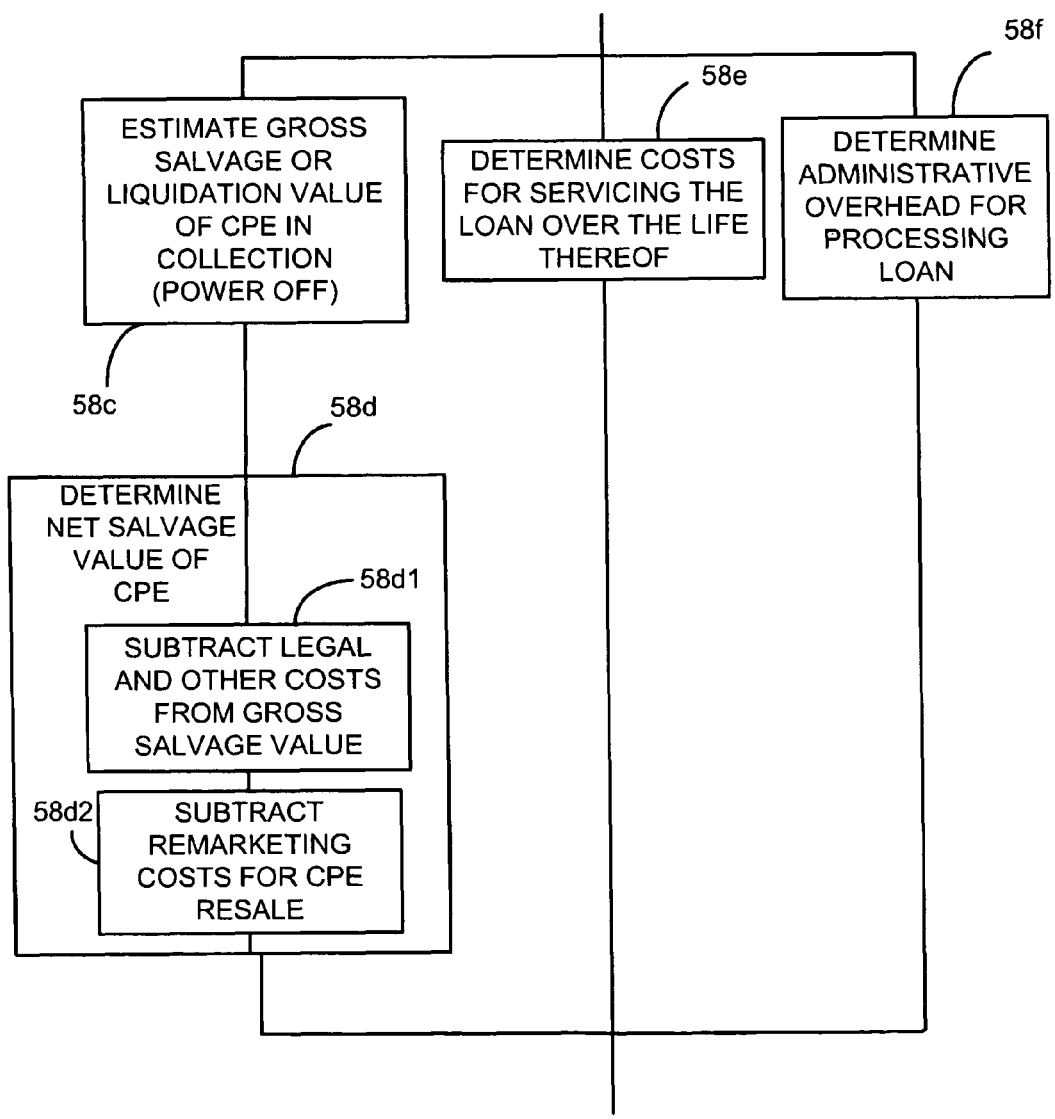
FIG. 6 illustrates routine C shown in FIG. 3.

Reference is now made to FIG. 6 wherein routine C is executed (as part of step 58). That is, the loan value (and terms) will take into account any legal and other costs associated with collection should the consumer/borrower default on the financing or loan. These legal and other costs may include seizure costs and professional CPE service costs. In particular, at step 58c, the gross salvage or liquidation value of CPE 10 will be estimated and factored into the loan determination at step 58c. At step 58d1, the net salvage value of the CPE 10 is determined. As part of this step 58d, legal costs associated with the collected property will be subtracted from the gross salvage value at substep 58d1. In addition, remarketing costs for CPE 10 resale will be subtracted from the gross salvage value of the CPE at substep 58d2. These costs are factored into the loan equation at step 58. In addition to these factors, there are costs for servicing the loan over the life thereof and other administrative overhead costs for processing the loan. These factors are determined at steps 58e and 58f.

At the same time as the steps of routines B and C are performed, or any other suitable time, to ultimately make a determination about loan terms, the consumer's application information shall be reviewed for fraud. In addition, the effective monetary value of CPE 10 is estimated. Rebates, credits, other subsidies and labor costs are determined and subtracted from the gross value of the CPE 10. The gross costs of the CPE 10 are typically provided by a solar installation professional/contractor or may be obtained from a database from invoice information. The estimate provided by the professional will likely include actual costs for the equipment and the professional costs for installation. Rebates are based on the state in which the CPE will be positioned.

Returning to FIG. 3, once step 58 is executed wherein the loan award amount is determined along with the terms thereof, the consumer's application is approved and the loan is offered to the consumer at step 60. Execution then moves to step 62 wherein the consumer accepts the loan. Now, once the loan package (defined) is determined, offered and accepted by the consumer (steps 58, 60, 62), a financial instrument shall be created supporting the loan or financing for the CPE 10. In an effort to increase the likelihood that the loan will be repaid, as part of the terms of the loan, the lender has the option to (1) secure the loan against personal and/or real property, at step 64 (routine D shown in FIG. 7) and/or (2) receive an assignment of the receivables at step 66 (alternatively or in addition take or receive an assignment in the other power proxy elements (besides the receivables), CPE attributes, a power purchase agreement, power contract and/or a conditional sales contract (all discussed below)). If the lender decides to secure the loan against personal and/or real property, a security interest(s) as discussed below shall be created as part of the financial instrument. If the lender chooses to receive an assignment of the receivables (unsecured loan), the lender will require that the consumer/borrower execute an agreement which, among other things, assigns the rights in the receivables to guarantee the loan. The same holds true for any assignment in other power proxy elements, power attributes, CPE attributes, a power purchase agreement, power contract and/or a conditional sales contract (all discussed below).

If the lender chooses to secure the loan against the personal property and/or real property as discussed below, the lender may follow the steps set forth in routine D in FIG. 7. In particular, at step 64a, the lender will take a security interest in the power proxy 80 as detailed in FIG. 8. Details of securing the power proxy are described with reference to routine F in FIG. 11. In addition to the security interest in the power proxy 80, the lender may take a security interest in the CPE 10 at step 64b (raw equipment as opposed to the attributes of the CPE 10 as described below) as well as in the real property on which CPE 10 is expected to be disposed at step 64c. Details of securing the CPE 10 and real property are described in routines G and H, respectively, in FIG. 11.

In addition or alternative to the security interests discussed thus far, the lender may take a security interest in the rebates, credits and any subsidies associated with the purchase of the CPE 10 and any power purchase agreement at steps 64d and 64e, respectively. The steps for securing the property in these steps are defined in routines I and J, respectively in FIG. 11.

Figure 11:
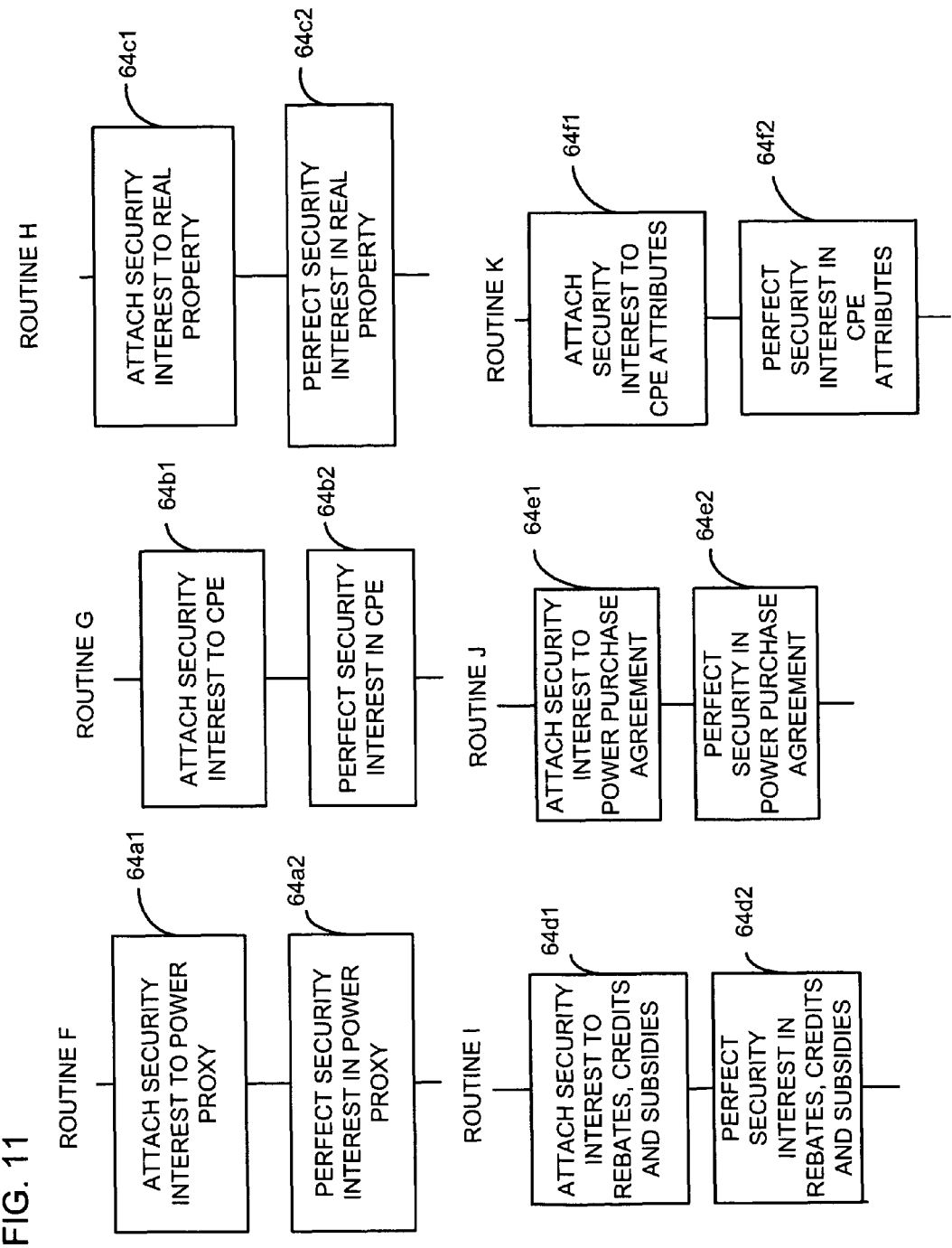
FIG. 11 illustrates routines F, G, H, I, J and K shown in FIG. 7.

Lastly, the lender will likely take a security interest in the attributes associated with the CPE 10 at step 64f as defined in routine K in FIG. 11. The lender may secure the loan for the CPE 10 by taking a security interest in one or more of the power proxy (elements in FIG. 8), CPE, real property, rebates, credits and subsidies, power purchase agreement, and CPE attributes as set forth in steps 64a-f.

As stated above, the security interests discussed above (one or more) will be created as part of the financial instrument between the lender and the borrower/consumer. The financial instrument may include one note supporting the entire balance or a portion of the loan (financing) for the CPE 10. Alternatively, the financial instrument may include a plurality of notes supporting a plurality of amounts of the loan (financing) for CPE 10 wherein the sum of the amounts equals the balance of the loan or alternatively is less than the balance of the loan. In the embodiment in which a plurality of notes are used, such plurality of notes may be cross-collateralized whereby a default by a consumer on one or more notes (of the plurality of notes) triggers a default by the consumer on any or all of the remaining notes. Alternatively, the plurality of notes may not be cross-collateralized whereby a default by the consumer on one note will not trigger a default by the consumer on the remaining notes (of the plurality of note under the financial instrument).

Figure 8:
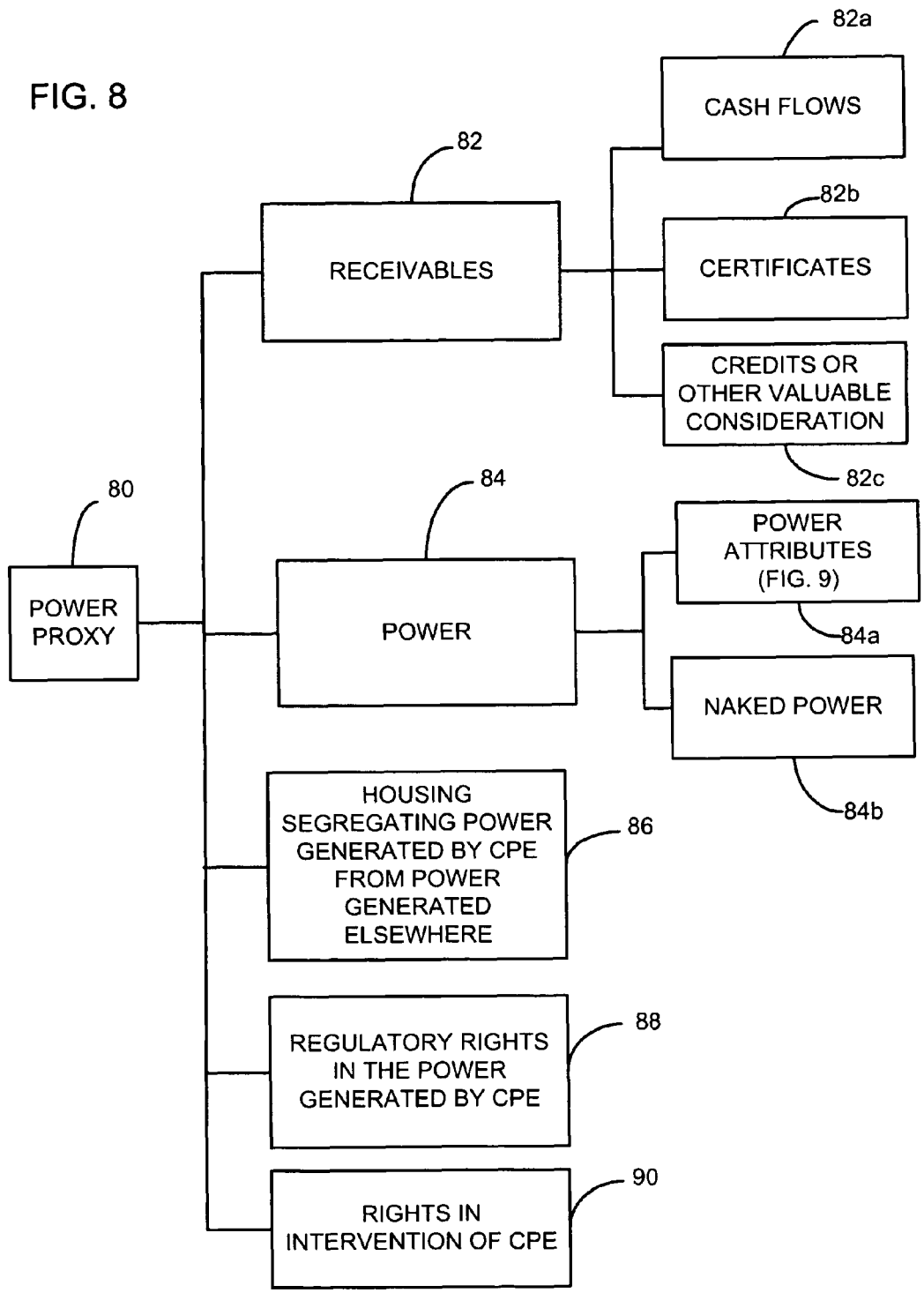
FIG. 8 illustrates examples of a power proxy shown in FIG. 7.

Reference is now made to FIG. 8 wherein examples of the power proxy 80 are shown. In particular, power proxy 80 includes receivables 82, power 84 and housing 86. Receivables 82 may be cash flows 82a, certificates 82b, and/or credits or other valuable consideration 82c for the power generated by the CPE 10. The receivables 82 may be provided by a utility or other entity that pays or reimburses a consumer for power generated by the CPE 10. Power 84 may be defined as power attributes 84a as set forth in FIG. 9 or naked power 84b. Power attributes 84a as defined in Appendix B are the characteristics of power that are transferable separate and apart from the actual naked power itself. Naked power is merely the electrons themselves. Housing 86 is used to segregate power (naked power) generated by the CPE 10 from power generated elsewhere (e.g., other consumer power or utility power). The housing 86 may be identified by warehouse receipts, bill of ladings, and/or other documents evidencing title to housing 86 including, without limitation, warranty registration and affixed serial numbers. Note that a security interest in the housing is also known as an administrative security interest.

Power proxy 80 also includes regulatory rights 88 in the power generated by the CPE 10. For example, a regulatory entity such as a State PUC with control over a utility can change the amount billed to the consumer. These charges are similar to those third party charges that can be added to phone bills. The penalty for default would be loss of service and/or collection efforts. Such regulatory rights 88 are created by debiting a consumer's bill for power generated by the CPE 10 or alternatively by updating a consumer record. Power proxy 80 further includes rights in intervention 90 of the CPE 10. That is, intervention rights is the ability (i.e., right) to interfere with the consumer's ability to use the CPE 10 to generate power. Such intervention may be by sending a person out to intervene or using a device (local or remote) to intervene.

Figure 9:
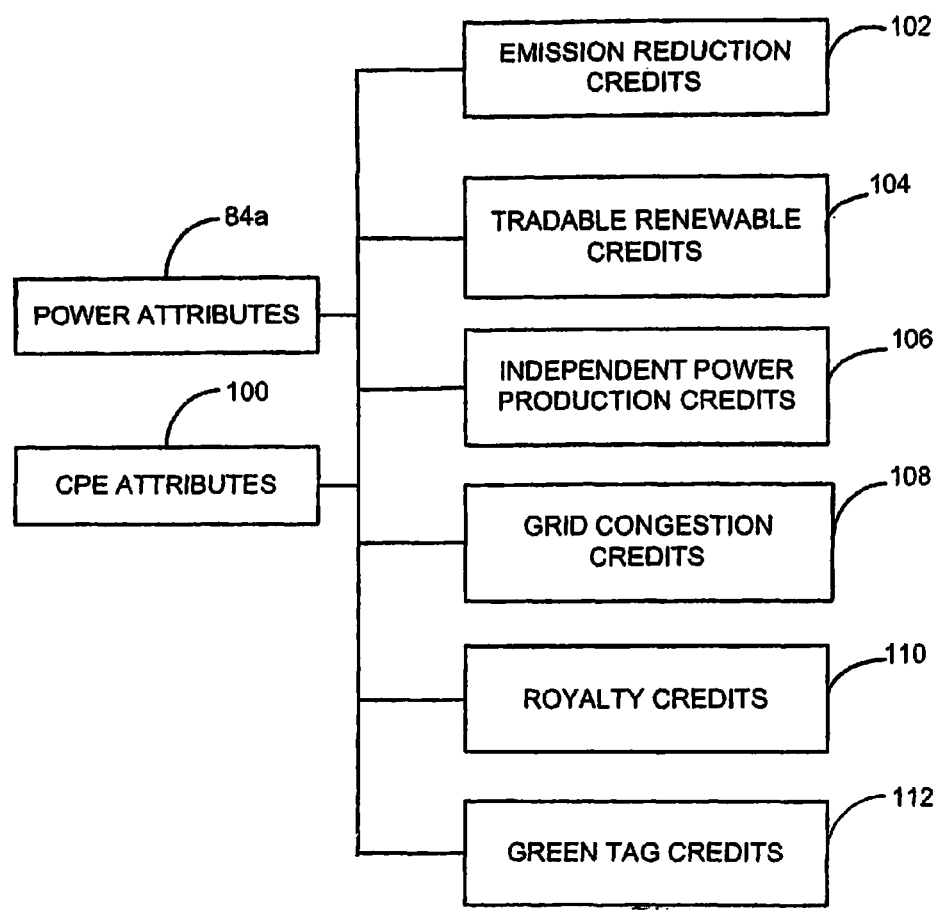
FIG. 9 illustrates examples of the attributes of power or CPE shown in FIG. 7.

Reference is now made to FIG. 9 wherein power attributes 84a and CPE attributes 100 are shown. The attributes (power and CPE) shown in FIG. 9 may be associated with either power and/or the CPE 10 (i.e., indistinguishable from power or the CPE 10). Therefore, the attributes are shown in the same figure (FIG. 9) as associated with both power 84 and the CPE 10. Power attributes 84a and/or CPE attributes 100 include emission reduction credits (ERC) 102. ERCs 102 (certificates) are assets that can be used by its owner or sold to entities that need emission (e.g., ROC, NOx, PM (including $PM_{10}$), CO or Sox) offsets. An emission offset occurs when an entity compensates for an increase in emissions in one area by decreasing emissions in another area. ERCs 102 are only issued for reductions of actual emissions that are quantifiable, enforceable, permanent and surplus. Typically, there is no minimum or maximum limit on the amount of reductions that may be eligible for ERC (certificates). Once the ERC (certificate) is redeemed, the ERC is retired, and cannot be used again. State or county entities ultimately determine the rules by which ERCs 102 are issued and redeemed. Suffice it to say, the ERC system is both good for business and good for the air. ERCs 102 also means earning goodwill in the community.

Power attributes 84a and/or CPE attributes 100 may also include tradable renewable credits (TRCs) 104. TRCs 104 shall mean any and all awards, credits and/or other consideration representing the value for the attributes associated with power generated by a renewable energy ("green") source. These attributes can be unbundled (i.e., separated) from the underlying power itself (naked power) and sold independently as one or more discrete, tradable instruments to entities that value "greenness."

In detail, TRCs (green tags) are a market mechanism that represent the environmental benefits associated with generating power (electricity) from renewable energy sources. Rather than functioning as a tax on pollution-causing electricity generators, as traditional carbon emissions trading programs do, TRCs function as a non-governmental subsidy on pollution-free electricity generators. In states which have a TRC program, a TRC energy provider (such as a wind farm or a consumer with CPE) is credited with one TRC for every 1000 kWh of electricity it produces. A certifying agency gives each TRC a unique identification number to make sure it doesn't get double-counted. The TRC or green energy is fed into the electrical grid (by mandate), and then the accompanying TRC can be sold on the open market.

Power attributes 84a and/or CPE attributes 100 also include independent power production (IPP) credits 106 and grid congestion credits 108. IPP credits 106 shall mean the value in aggregating individual consumer power generation and selling aggregated power for more than the value of selling the components as un-aggregated power. In other words, IPP credits 106 may be aggregated or accumulated to attain the status of an IPP which afford that entity the opportunity to sell power at greater value than the value an entity may receive individually, for example, for selling power generated by CPE (e.g, below wholesale rates).

Grid congestion credits 108 are a mechanism that represents certain benefits associated with generating electricity from renewable energy sources and with relieving demand on the local power grid. Grid congestion continues to be a problem as the demand for power increases. Grid congestion credits 108 function as a credit or subsidy for a reprieve on local grid congestion.

Power attributes 84a and/or CPE attributes 100 may also include royalty credits 110. Royalty credits 110 means the cash flow associated with royalty interests. Royalty interests are payments made for the use of property such as the CPE 10. The payment amount is usually a percentage of revenues obtained through the use of the property. Royalty credits 110 may also include an option to purchase some or all of the CPE, a divided or undivided interest in the CPE, a right to receive a certain amount of the output power from the CPE and/or royalty interest in the CPE (as indicated earlier). Power attributes 84*a* and/or CPE attributes 100 also includes green tag credits 112. Green tag credits 112 are the same as tradable renewable credits 104.

The power attributes 84*a* and/or CPE attributes 100 are credits that may include (identified by or associated with) federal tax credits, state tax credits, utility credits, third party credits, subsidies and/or rebates.

It should be note that a lender or consumer may sell the attributes (power attributes and/or CPE attributes) under different circumstances to reduce the amount financed.

In order to secure the loan as set forth in step 64 in FIG. 3, the lender may take security interests as set forth in routine D of FIG. 7.

Reference is now made to FIG. 11 wherein routines (F-K) for taking security interests in routine D (FIG. 7) are described in detail. In particular, the lender shall take a security interest in the power proxy 80 (i.e., power proxy security interest). There are two steps in routine F to accomplish this. First, the lender must attach the security interest to the collateral (power proxy elements in FIG. 8) at step 64*a*1. In other words, the security interest must be created by a financial instrument or other legal agreement document.

To create a security interest, the lender may require the consumer/borrower to execute such a financial instrument (UCC1 statement for personal property). The financial instrument will describe the collateral. In this case, the collateral includes one or more power proxy 80 elements shown in FIG. 8 (receivables 82, power 84, housing 86, regulatory rights in power generated by the CPE 88 and the rights in intervention 90). In short, the financial instrument gives the lender the authority to foreclose or make a claim to the collateral. The financial instrument will also include other terms including payment terms, what constitutes a default, the rights of the lender/creditor upon default, maintenance of the solar equipment, insurance for the equipment and possibly other terms, including but not limited to the right to assign the financial instrument by the lender.

Second, the lender must perfect the security interest to ensure that the lender has priority over other creditors of the collateral. This is accomplished at step 64*a*2. There may be different methods for perfecting different power proxy elements shown in FIG. 8. The category or characterization of the elements (e.g., "receivables") will ultimately dictate the method of perfection (in accordance with State law). One common method used for perfection of the power proxy security interest (if such elements are characterized as personal property under state law) is filing a financing statement (UCC1 filing for personal property). In short, the statement shall include the name of the consumer (borrower/debtor), the name of the secured party/lender and the property covered by the statement. There are, however, exceptions to filing. Possession of the collateral is one of them. For purpose of a security interest in "receivables" (e.g., cash flow security interest), the filing method for perfection would apply because "receivables" are likely characterized as personal property under relevant State law (UCC). On the other hand, "regulatory rights in the power generated by the CPE" may likely be characterized differently (see below for example).

In the event a filing is required, the lender shall follow the laws of the State to determine the proper office for filing. The most common office to file is the Secretary of State. In other situations, the recording office for filing is the county in which either the collateral or debtor is located. The location for filing varies by State and the type of collateral. For example, in California, the proper location for filing is the Secretary of State unless the security is a motor vehicle for which the proper location is the Department of Motor Vehicle. In Virginia, the proper location for filing is Virginia State Corporation Commission office of the Clerk. In Maryland, the proper location for filing is the Maryland Department of Assessments and Taxation. Article 9 of the UCC dictates the rules and requirements for taking security interests in personal property. All States have adopted Article 9 of the Uniform Commercial Code (UCC), but some have exceptions (e.g., filing). (Chattel mortgages may alternatively be used as a vehicle for security interests described herein if permitted by an individual State.).

An example of attachment and perfection is now described with respect to the regulatory rights in the power generated by the CPE (element of power proxy). In particular, attachment may take the form of a bill or invoice with the added charges representing the loan payments. Perfection in this case would be the possession of a copy of the bill or invoice which listed additional charges. The charges will be added to the balance or charged against any credit on the invoice. A copy of the bill with the additional charges in the possession of the lender shall give the lender superior rights over the consumer's payments against third parties.

Another example of attachment and perfection is described for a security interest in the housing 86 segregating power generated by the CPE from power generated elsewhere. Creating the security interest in the housing may include identifying the housing in the financial instrument by a warehouse receipt(s), bill of lading or other document evidencing title of the housing. Perfection may include possession of the warehouse receipts, bill of lading or other document evidencing title.

In addition to the security interest in the power proxy 80, under the terms of the arrangement with the consumer, the lender shall also take a security interest in CPE 10 (CPE security interest) as set forth in step 64*b*. To this end, a CPE security interest will be created by the financial instrument. In reality, the lender will do this because the lender wishes to ensure that (1) the CPE (as an asset) continues to generate power in order to garnish the benefits from the CPE and (2) the lender will be repaid upon the sale of the property in the event the consumer/borrower defaults. The security interest documents such as the financial instrument may permit the lender to place additional restrictions on the use, maintenance and insurance as well as restriction on the removal or sale of the CPE.

As for the process, the same UCC requirements equally apply to the CPE (provided that the CPE constitutes personal property as opposed to real property). CPE security interest must be attached (created) and perfected as set forth in steps 64*b*1 and 64*b*2 of routine G in FIG. 11. Under the terms of the arrangement (financial instrument), the lender will be also be authorized to foreclose or make a claim to the collateral (CPE) described in the financial instrument. Similar to the power proxy security interest, the agreement will also include payment terms, default terms, lender/creditor terms upon default, CPE maintenance terms and insurance requirements. The agreement is likely to be State specific and take into consideration such elements as "one right of action" rules.

In addition to attachment, the lender must perfect the CPE security interest to ensure that the lender has priority over other creditors of the collateral. This is accomplished at step 64*b*2. Perfection will likely be accomplished by filing a UCC1 statement (UCC1 filing for personal property). In short, the statement shall include the name of the borrower/debtor, the name of the secured party/lender and the property covered by the statement. In this case, the property is CPE. In the event a filing is required under applicable State law, the lender shall follow the State laws to determine the proper office for filing. As indicated above, the most common office to file is the Secretary of State. In other situations, the recording office for filing is the county in which either the collateral or debtor is located. The location for filing varies by State and the type of collateral.

Note that for security interests in personal property, the UCC filing is typically active for a period of five years unless continued for an additional five years at a time. The UCC filing will lapse at the expiration of the five-year period unless a continuation statement is filed, typically within six months prior to the date of lapse.

In addition to the security interests in the power proxy (e.g., receivables/power and CPE), the lender may secure the loan against the real property/estate on which the CPE will be attached. Much like the terms for the CPE, a security interest in the subject real property (real property security interest) will be attached and perfected (steps 64c1 and 64c2 of routine H in FIG. 11). The conventional real property/estate documents will be signed to attach (create) the interest to the real property. Such documents typically include the mortgage papers. Real property/estate papers (financial instrument) are typically separate from the documents (financial instrument) relating to the power proxy security interest and CPE security interest. However, all security interest documents may be evidenced by one universal financial instrument (provided such instrument abides by State law.)

If required, a deed will transfer to the lender or trustee and then be recorded along with the mortgage documents in the appropriate office for perfection. The real property documents are typically recorded in the county or local office in which the real property is located. The CPE will also be subject to and recorded as part of real property/estate. Once filing is performed, the transaction is secured against third parties. There is no need for further action on the part of the lender unless there is a default. The recorded documents remain of record until the lender is repaid the full amount of the loan. At this time, the mortgage documents will be returned to the consumer/borrower.

In the event a consumer has a conditional sales contract for the real property, the lender may take a security interest in the conditional sales contract (attachment and perfection).

Note that one real value to the consumer in securing the loan against the real property is the tax benefit. The consumer/borrower should receive tax deductibility treatment from the IRS and/or other taxing bodies for the interest on real property mortgage. As an alternative to a mortgage, a deed of trust may be used to secure the payment of the loan.

In accordance with the invention, the lender has now attached and perfected (i.e., filing) the CPE as personal property as well as part of the real property. There is a real advantage in following this process. The dual filings ensure that the public is placed on notice of the rights in the CPE against any third party interests. Since under State law there may exist some uncertainty whether CPE constitutes personal or real property, in accordance with the invention, the lender shall now record the CPE as personal property in the appropriate office of the Secretary of State (for example) and will record the CPE along with the real property in the appropriate county office. In this respect, the lender's interest in the CPE against any third party interests as well as bankruptcy or insolvency proceedings has been adequately protected. With respect to any type of property secured (described above), security interest documents may require a notary for creation of such documents.

In addition to the power proxy, CPE and real property security interests, the lender may secure the loan by taking a security interest in the rebates, credits and subsidies offered by the Federal, State and possibly local governmental entities for the CPE 10 at step 64d (California Solar tax credits are one type of rebate/subsidy). Steps 64d1 and 64d2 of routine I (FIG. 11) describe attachment and perfection of such rebates, credits and subsidies. The interest will be created by a financial instrument (agreement) which will describe the collateral (rebates, credits and subsidies) and authorize foreclosure or make a claim to the collateral. The financial instrument (agreement) will also include payment terms, default terms, lender/creditor terms upon default, CPE maintenance terms and insurance requirements. The financial instrument (agreement) is likely to be State specific and take into consideration such elements as "one right of action" rules.

In addition to attachment, the lender must perfect the security interest in the rebates, credits and subsidies to ensure that the lender has priority over other creditors of the collateral. Perfection will likely be accomplished by filing a financing statement (UCC1 filing for personal property) in the appropriate place or office dictated by State law. In short, the statement shall include the name of the borrower/debtor, the name of the secured party/lender and the property covered by the statement. State law will dictate the characterization of the subject property and the rules and requirements for attachment and perfection.

In addition to the security interests described, the lender may take a security interest in a power purchase agreement. A power purchase agreement is an agreement between a power provider and a consumer in which the consumer agrees to pay the power provider for power generated by the CPE. (That is, the consumer agrees to buy power generated by the CPE from the power provider). The term (i.e., length) of the agreement may vary. The security interest may be created by a financial instrument (alone or with other security interests described herein). Attachment and perfection are accomplished in steps such as steps 64e1 and 64e2 of routine J, respectively in FIG. 11. State law will dictate the characterization of the subject property (i.e., power purchase agreement) rules and requirements for attachment and perfection. The lender may also take a security interest in any power contract between resident consumer and a utility.

In addition to the security interests above, the lender will likely secure the loan against the CPE attributes (similar to power attributes under power proxy shown in FIGS. 8-9). Attachment and perfection are set forth in steps 64f1 and 64f2 of routine K in FIG. 11 respectively. In particular, the security interest in CPE attributes will be created by a financial instrument and the security interest shall be perfected in accordance with State law. For the CPE attributes (like power attributes), such property may likely fall into the category of personal property and be perfected in accordance with the UCC (e.g., UCC1 filing).

In addition to the security interests above, the lender may take a security interest in (1) any assignment discussed above, including for example, the receivables or other power proxy elements and/or (2) any long term lease of the CPE and/or real property on which the CPE is disposed, and/or any chattel mortgage for the CPE. Attachment and perfection shall abide by State law for personal and real property.

In accordance with the present invention, the method for financing discussed above and the creation of these financial instruments may establish a market for creating and trading of such financial instruments. This market may include CPE installers which market services by introducing consumers to financing options through the plurality of financial instruments and brokers who facilitate the formation of the plurality of financial instruments.

Once all desired security interests are attached and perfected, execution of the method in FIG. 3 is complete. At this point, the lender may execute a check and forward it directly to the installer or other such suitable party. The check may be made for the entire amount or payment may be made incrementally. A first incremental payment may be made, for example, as a deposit for the materials. Another example may be an order or delivery of the materials/components that triggers a first incremental payment. Subsequent incremental payments could be made upon passing an inspection of the installation (at job site by any entity including a government entity, a private provider of traditional governmental service including power, sewage entities, or the consumer even). Under another financing scheme/model, payment alternatively could be made to a distributor, a dealer or a manufacturer of the components of the CPE. Payments to these entities in an incremental scheme will help reduce fraud and will also ensure that the money is actually used to purchase and install the CPE in accordance with the requirements set forth in the financing application process.

When the consumer/borrower defaults on his/her obligations to repay the loan, the lender as a secured party has the rights and remedies provided in the security agreement, provided by the State UCC and other laws as well as provided in the mortgage documents. In general, the lender may reduce his/her claim to judgment, foreclose or otherwise enforce the security interest(s) by any available judicial procedure. The rights and remedies may be cumulative. In the embodiment of the present invention, the lender, in case of a default, will focus attention on the secured collateral. In this case, the collateral is the one or more power proxy 80 elements (FIG. 8), the CPE 10, and the underlying real property on which the CPE is attached, rebates, credits and subsidies, power purchase agreement, CPE attributes (like power attributes as part of power proxy) and/or any other property secured. However, the real property is not required for collection. The lender has other vehicles to ensure loan repayment including, for example, the power proxy including the receivables, power and the CPE itself. Therefore, the process for foreclosure is greatly simplified. With a simpler, less costly foreclosure procedure the risk premium associated with these loans is minimized. The reduced process is discussed below in more detail.

Now, a loan for the purchase of CPE may be repaid using several different methods under the terms of an agreement with the consumer/borrower. Under a traditional loan terms, the consumer repays incrementally during the life of a loan much like any loan (e.g., mortgage). The payments are typically made in monthly increments. Payments may be initially applied toward interest with the remaining monies applied toward the principal of the loan if the loan is fully or partially amortized. The consumer may make prepayments to the lender to be applied toward the principal with and without penalties. While this traditional payment method has been adequate, there exists an improved repayment method that would increase the likelihood that the lender's loan will be repaid and/or increase the lender's profits and/or reduce the cost of the loan to the consumer/borrower.

By following the steps of the method set forth in FIG. 3 (including the routines in later Figs.) in accordance with an embodiment of the present invention, the entire lending underwriting standards (and process for such standards) have been simplified (modified) and the costs have been reduced for the consumer. The process is now more streamlined (reduced) than the typical process for obtaining a traditional mortgage for the subject real property. In the traditional process, the lender will undertake an appraisal evaluation, a title search and other administrative functions.

In accordance with an embodiment of the invention, limited/abbreviated or no appraisals, property inspections or title searches will be conducted. There is no need for these functions when the lender takes into consideration other factors to repay the loan such as the receivables, rebates, credits, and subsidies, value of the CPE itself (for example). Such factors considered are used to modify, for example, the income-to-debt ratio and the debt service coverage of the lending underwriting criteria. In addition, such factors may be taken into consideration to show an increase in appraisal value of the real property (if an appraisal is actually performed). In other words, sufficient security exists in the personal property and other non-real property being secured (e.g., receivables in the power proxy, CPE, CPE attributes, the rebates and credits, etc.) as well as through use of credit information and any fraud verification.

Because there is no need for such evaluations, title searches and other administrative functions, the lending process is simplified and the costs relating to financing are reduced. Escrow requirements have also changed in view of the considerations above (security interests discussed as an example). In sum, the mechanisms used for underwriting enabling and escrow enabling take into consideration many factors (described above) to modify the lending underwriting standards as well as the fees associated therewith.

Figure 12:
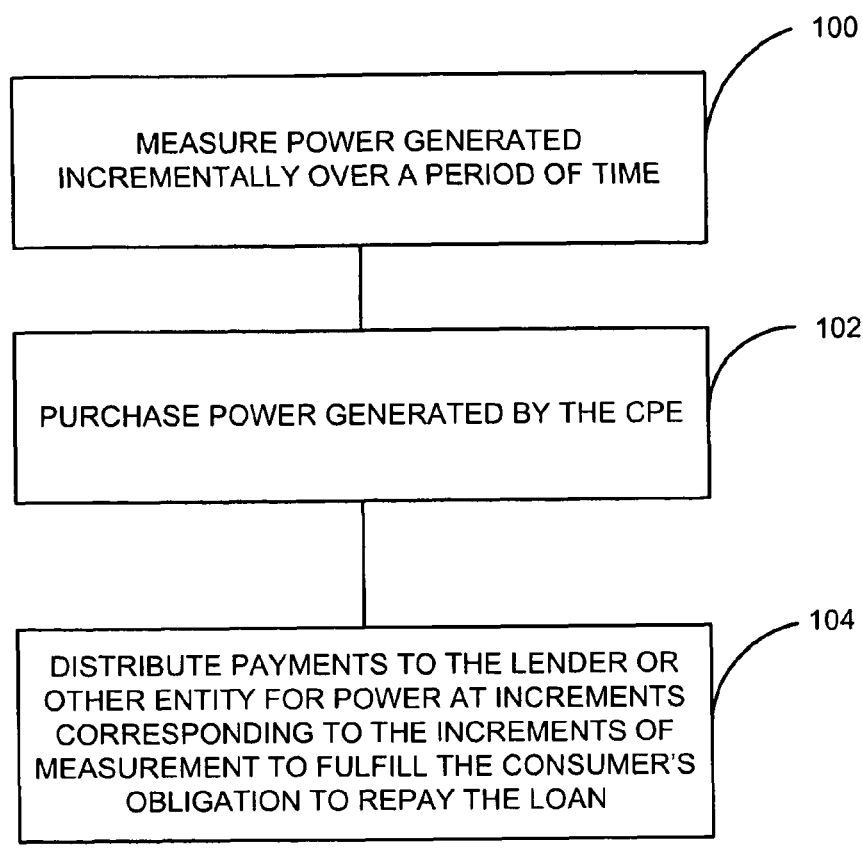
FIG. 12 is a flowchart of a method of financing the purchase of CPE in accordance with another embodiment of the present invention.

Another aspect of the invention is now described. In this aspect, the lender shall receive payments directly from a utility for the power (excess or directly off of the CPE) generated by the CPE and delivered onto the power grid. In such an arrangement, the utility shall purchase the power and distribute payments (process receivables) to the lender directly. The payments processed shall correspond to power measured at set increments. The consumer/borrower will continue to pay the utility for power (electricity) consumed. FIG. 12 illustrates an implementation of this method in accordance with an embodiment of the invention. It is assumed that the consumer has applied for a loan, and the lender has completed the steps of the method shown in FIG. 3. That is, the lender has offered and the consumer/borrower has accepted the loan at specified terms. At this point, the utility will measure or read the power consumed or generated by the consumer on a power measuring devices such as a meter (e.g., meter 30 shown in FIG. 12 at step 100. These measurements or readings are performed incrementally over a period of time (periodic power measurements). Most utilities perform readings on a monthly basis. However, the meter may be read at other increments including, but not limited to, weekly, daily, hourly or other interval or period of time-based readings (limited only by the physical meter measurement constraints, regulatory constraints, and automatic meter measurement constraints).

Depending on the meter used, the power read may be the excess power generated by the CPE (power generated that exceeds the power used by the consumer) or gross power directly off of the CPE. Traditional dial meters are commonly employed today for reading power consumption. In many cases, the utility bills a consumer for the amount of power used since the previous meter reading. Many of these meters, however, are capable of net metering.

Figure 13:
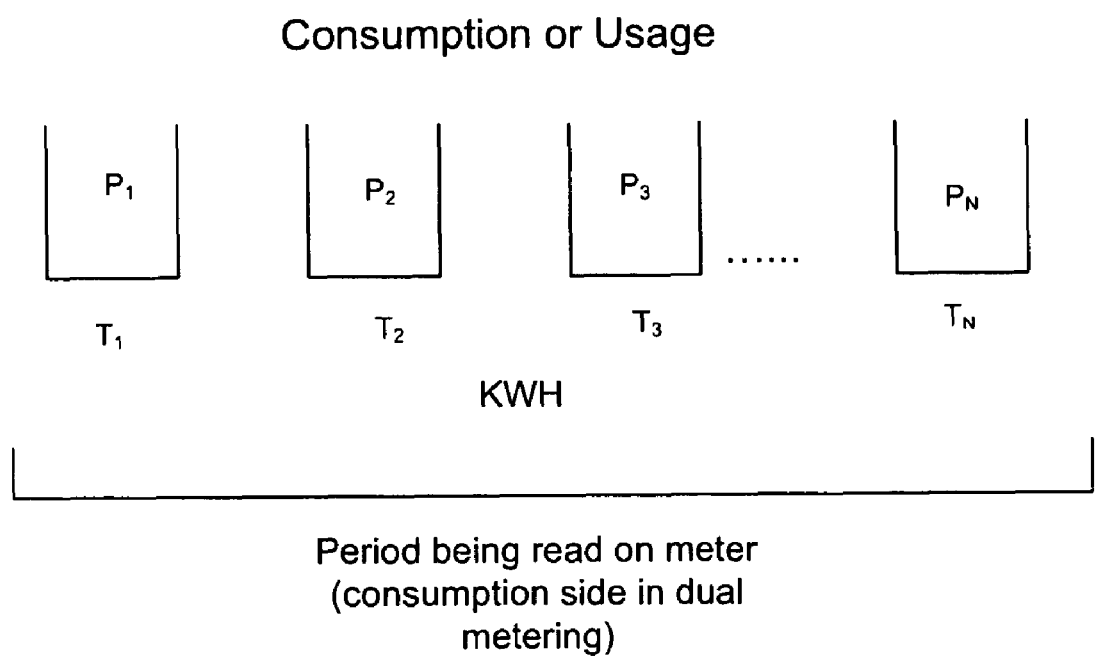
FIG. 13 is diagram of consumer power consumption.

There are also bidirectional (or dual meters as discussed below) that can simultaneously keep track of power (electricity) consumed and power generated by the CPE. In some cases, dual meters are employed. One meter is used for measuring the flow of power (electricity) into the building from the utility and the other is used for measuring the flow of power out of the building (generated by the consumer). With dual metering only, the power generated is used as collateral. The consumer might pay the power company directly for the gross power they use from the utility. FIG. 13 illustrates an example of power consumed in a dual metering setting. $P_1$-$P_N$ is the power read on the meter at $T_1$-$T_N$ times, respectively. Note the different price values $P_1, P_2, P_3 \ldots P_N$ for times $T_1, T_2, T_3 \ldots T_N$.

Smart metering systems such as automatic meter reading (AMR) systems enable the utility to measure a consumer's power consumption remotely as well as more frequently than manual readings at a lower cost. Smart metering systems allow the utility to communicate between a meter interface module and a central office via a communications system. Communication may take the form of a telephone, power line carrier, radio frequency, internet, cellular or cable television.

Returning to FIG. 12, regardless of the method of meter reading (manually or remotely using smart systems), power measurements are taken incrementally over a period of time. The period may be any desired time interval, and power generated by the CPE is purchased by the utility or other entity at step 102. The power may be the excess power or gross power directly measured from the CPE 10 as discussed above. In the event of net-metering (one meter), net power consumed at any increment of time (over a period of time) will have a negative value. Excess power generated measured at any given increment of time (over a period of time), however, will have positive values. The polarity of this convention may be switched.

As stated above, at step 102, the power generated by the CPE and delivered onto the power grid is transferred to, converted and/or purchased by the utility. A billing mechanism may be used to determine on a periodic basis any value of the power generated by the CPE 10 (excess or directly off of the CPE 10). (There may also be a financing mechanism for identifying any rebates, credits and/or subsidies for the purchase of the CPE 10.) The purchase may be in the form of credit, certificate (e.g., New Jersey), cash or security representing value for the power.

Following step 102, the utility will distribute payments to the lender directly (or alternatively the consumer pays the lender directly as discussed below) to fulfill the consumer's obligation to repay the loan at step 104. Specifically, the billing mechanism provides payments or credits the value for the power generated by the CPE to the lender or other entity for financing of the CPE (financing discussed herein is used to mean loan for CPE purchase but it may also mean purchase, lease, installation and/or maintenance of the CPE 10). Payments will be made at increments corresponding to meter reading increments. In the current situation, the increments are made on a monthly basis. However, the meter reading frequency (period or increments) may vary as desired (e.g., weekly, daily, by minute or other time). While it is possible to increase the frequency of meter reading using current manual methods, smart metering (or remote meter reading) can make this function more practical and economical.

In an alternative embodiment, the consumer may pay the lender directly or the consumer pays the lender or through a servicing agent. A servicing agent is a third party that collects money and interfaces with the consumer. In yet another alternative embodiment, the consumer may pay the lender directly until there are payment issues (i.e. the consumer is late with payments), and then the utility may step into the process and pays the lender directly.

In accordance with the present invention, the step of securing the loan against the receivables would effectively mean that the security interest would be a right in the receivables generated in accordance with the frequency of readings (e.g., on a monthly, daily or other unit of time basis). Alternatively, in the event the lender chooses to be paid conventionally (paid by the consumer), the receivables may be garnished at the frequency rate of the meter readings (in the event of a default).

As indicated above, the method of FIG. 3 and related FIGS. 4-13 were described in terms of a loan for purchase. However, the present invention contemplates a variety of financing techniques for a variety of activities including purchase, lease, installation and/or maintenance of the CPE 10. It is also noted that the method of FIG. 3 may be computer implemented, manually implemented or a combination of computer and manual implementation.

Figure 14:
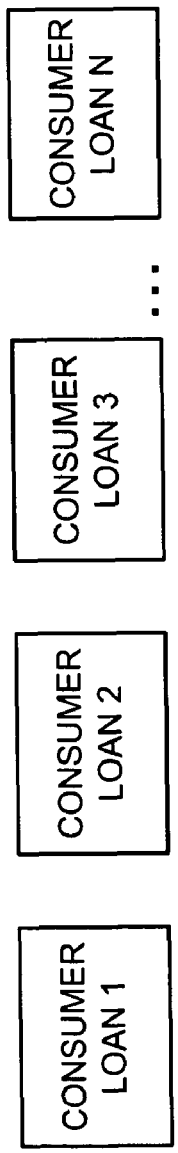
FIG. 14 illustrates a pool of individual loans for a collateralized power obligation (CPO) in accordance with another embodiment of the present invention.
Figure 15:
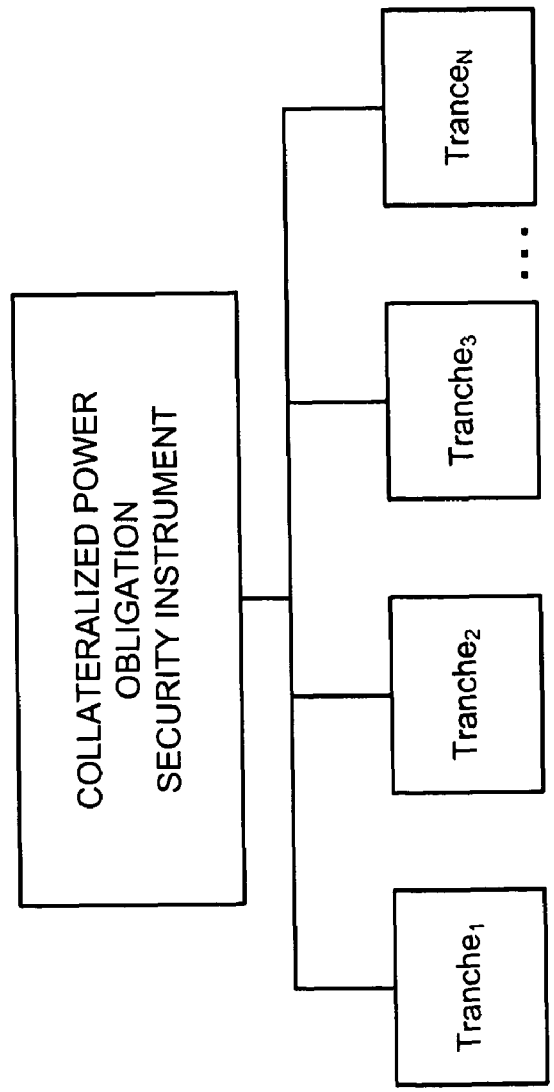
FIG. 15 illustrates a CPO in accordance with the embodiment of the present invention shown in FIG. 14.

Reference is made to FIGS. 14 and 15 wherein another embodiment of the present invention is shown. The method employs a collateralized power obligation (CPO) for the cash flow from groups or pools of individual loans described above with respect to FIG. 3. As an example, one group of pooled loans is shown in FIG. 14 (LOAN #1, LOAN #2, LOAN #3 . . . . LOAN #N). A CPO is similar but not identical to a CMO (collateralized mortgage obligation), CDO (collateralized debt obligations) or mortgage pass through security. In this embodiment, a security is backed by its ownership of the pool of the individual loans (offered in FIG. 3). This security or instrument is secured by the cash flow of the pool of individual loans as well as ownership in the underlying pool of individual loans.

In the CPO (in brief), the regular principal and interest payments made by borrowers (consumers) could be separated into different payment streams, creating several bonds that repay invested capital at different rates, with different terms. In short, the advantage of a CPO is that the original lender keeps the loans on their books only for a short time. The loans are resold at a profit to the equity or debt investors whom will pay more for tranches than the sum is worth. A tranche is a class of security or ownership interest in a CPO offering. In a CPO, the original lender may become what is known as a packager. The packager might only hold the individual loans temporarily. Similar to a warehouse line of credit, after a sufficient amount of loans are accumulated to create a CPO, the loans are conveyed to a trust or entity that owns the underlying loans for the benefit of investors that own an interest in various cash flows.

The consumer/borrower will likely pay the loan in installments composed of both interest and principal. Over the life of the loan, the interest component of payments, which typically comprises a majority of the payments in the early years, gradually declines as the principal component increases. To obtain funds to make more loans, original lenders or packagers either "pool" groups of loans with similar characteristics to create securities or sell the loans to issuers of securities. The securities created from pools of loans are essentially "pass-through securities." Pass-through securities or bonds represent a direct ownership interest in a pool of loans or the trust or entity that holds these pools of loans. As the consumers whose loans are in the pool make their loan payments, the money is distributed on a pro rata basis to the holders of the securities.

In accordance with the present invention, CPOs offer investors a wider range of investment time frames and greater cash-flow certainty than had previously been available. As indicated above, the CPO issuer assembles a package of these pass-through securities or bonds and uses them as collateral for a multiclass security offering (as described above) such as tranches. The CPO structure enables the issuer to direct the principal and interest cash flow generated by the collateral to the different tranches in a prescribed manner, as defined in the offering's prospectus, to meet different investment objectives.

The cash flow from the CPO collateral may be allocated in a variety of ways. Usually, it is first allocated to meet the interest obligations on all tranches in the offering. Principal repayments, both scheduled and prepaid, are then distributed to the different classes of bondholders according to a predetermined priority schedule which is outlined in the CPO prospectus or offering circular. The tranche receiving principal repayment is referred to as "active" or "currently paying." In more complex structures, more than one tranche can be paying principal at a time. In addition, there may be fees associated with tranches. Also, different tranches may have difference credit ratings based on risk assessed.

Each CPO tranche has an estimated first payment date, on which investors can expect to begin receiving principal payments, and an estimated last principal payment (or maturity) date, on which they can expect their final dollar of principal to be returned. The period before principal payments begin in the tranche, when investors receive interest-only payments, is known as the "lockout" period. The period during which principal repayments are expected to occur is called the "window." Both first and last principal payment dates are estimates based on prepayment assumptions and can vary according to actual prepayments made on the underlying mortgage loans. These pass-through securities may typically appeal to investors with a certain investment horizon.

As seen in FIG. 14, several payment streams with varying amounts, interest rates and other conditions are shown (Loan #1-Loan #N). FIG. 15 illustrates the CPO with several tranches (Tranches$_x$). In general, the CPO may have several arrangements including a fast-pay bond with a maturity much shorter than the total pool, a bond paying interest only for a period that may be fixed on some condition, and a bond paying variable interest based on an index such as LIBOR, the Prime Rate or an index based upon US Treasury bills, notes and bonds. Regardless of the bond arrangement, the CPO backed by the type of financial instruments discussed in this application will have lower risk of default than an individual loan. The bonds will be secured against or collateralized by the power proxy, CPE, credit, rebates and subsidies for CPE, CPE attributes and/or the real property on which the CPE is attached (as defined above).

The CPO described above may have two unique tranches in accordance with two different embodiments of the invention. In accordance with one embodiment, one tranche represents future power/CPE attributes including emission reduction credits or tradable renewal credits. As part of the contract with the consumer, consumers will assign to the lender any future carbon credits or renewal energy credits (for example). These credits may be sold in the future in any market that develops for them.

In accordance with the second embodiment, another tranche represents the value that might accrue because of the scale or size of the CPO allows the CPO to become a larger IPP. In this respect, the CPO may have the right to become a power marketer with the right to sell power on the open market. Open market value is usually much higher than the prices offered by the utilities based on PUC dictated pricing. The two different embodiments of the tranche arise from assignable rights that the consumer will convey to the lenders.

While the embodiments of the present invention described in this application are applied to property in the U.S., the methods may apply in any jurisdiction U.S. or foreign).

It should be noted that the lender described herein may be any entity including a bank, finance company, individual or other entity that is legally authorized to lend money or advance funds. It should also be noted that the embodiments of the method (of the present invention) above applies to solar energy. In alternative embodiments, however, any renewable energy source may be used that generates electricity (that can be valued). Many utilities will purchase electricity from a number of sources including wind, biomass and hydroelectric (in addition to solar). The sources of energy can be either renewable or non-renewable.

In summary, the embodiments of the methods described herein offer opportunities for financing the purchase of CPE and other financial rewards that are either not offered by or do not suffer from the disadvantages of the prior art.

The foregoing description of the embodiments of the invention has been presented for purposes of illustration and description. It is not intended to be exhaustive or to limit the invention to the precise form disclosed and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and their equivalents.

I claim:

1. A method of increasing the likelihood of repayment of a loan provided by a lender for the purchase of renewable energy consumer premises equipment (CPE) by a consumer, the method comprising:
   (a) coupling the CPE to a power grid operable to receive at least a portion of the power generated by the CPE;
   (b) measuring power generated by the CPE and delivered onto the power grid of a utility; and
   (c) processing receivables from the utility associated with the power generated and delivered onto the power grid directly to the lender at times corresponding to power measurement to fulfill the consumer's obligation to repay the loan.

2. The method of claim 1 wherein receivables includes cash flow.

3. The method as recited in claim 1 wherein processing receivables includes distributing at least a portion of the receivables.

4. The method of claim 1 wherein processing receivables includes securing at least a portion of the receivables.

5. The method of claim 1 wherein processing receivables includes both distributing a first portion of the receivables and securing a second portion of the receivables.

6. The method of claim 1 wherein processing receivables occurs at time increments that are monthly, weekly, daily, by the minute or over any other period of time.

7. The method of claim 1 wherein the power delivered onto the power grid is the excess power generated by the CPE that exceeds the power from the grid consumed by the consumer.

8. The method of claim 1 wherein the power is selectively measured directly off the CPE.

9. The method of claim 8 wherein receivables are selectively processed at times corresponding to power measured selectively off the CPE.

10. A business method of increasing a likelihood of repayment of a loan, lease or other financial instrument provided by a lender for purchase, lease, installation, and/or maintenance of renewable energy consumer premises equipment (CPE) by a consumer, the method comprising:

(a) measuring excess power incrementally over a period of time generated by the CPE and delivered onto a power grid of a utility; and
(b) processing receivables from the utility associated with the excess power generated and delivered onto the power grid directly to the lender at increments corresponding to increments that the excess power is measured to fulfill the consumer's obligation to repay the loan, lease, or other financial instrument.

11. The business method of claim 10 wherein processing receivables includes distributing at least a portion of the receivables.

12. The business method of claim 10 wherein processing receivables includes securing at least a portion of the receivables.

13. The method of claim 10 wherein increments associated with the period of time are monthly, weekly, daily, by the minute or over any other period of time.

14. The method of claim 10 wherein the measurements are taken at times in which excess power is delivered by the CPE onto the power grid.

15. A method of billing by lender for financing renewable energy consumer premises equipment (CPE) installed on a consumer premises, the CPE capable of generating power, the power consumed by a consumer associated with the consumer premises, the method comprising:
(a) coupling the CPE to a power grid of a utility;
(b) distributing at least some of the power generated by the CPE onto the power grid;
(c) giving a monetary value to the at least some power generated by the CPE and distributed onto the power grid; and
(d) the utility making payment directly to the lender in the amount of the monetary value for power generated by the CPE and delivered onto the power grid to fulfill the consumer's obligation to repay the loan, lease or other financial instrument associated with the CPE.

16. The method of claim 15 wherein the power delivered onto the power grid is an amount of power generated by the CPE that exceeds the power from the grid consumed by the consumer.

* * * * *